(12) United States Patent
Fujimoto

(10) Patent No.: US 10,692,653 B2
(45) Date of Patent: Jun. 23, 2020

(54) CERAMIC SINTERED BODY AND PASSIVE COMPONENT INCLUDING THE SAME

(71) Applicant: YAGEO CORPORATION, Kaohsiung (TW)

(72) Inventor: Masayuki Fujimoto, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 127 days.

(21) Appl. No.: 15/796,261

(22) Filed: Oct. 27, 2017

(65) Prior Publication Data

US 2019/0131071 A1 May 2, 2019

(51) Int. Cl.
*H01G 4/12* (2006.01)
*C04B 35/626* (2006.01)
(Continued)

(52) U.S. Cl.
CPC .......... *H01G 4/1272* (2013.01); *C04B 35/46* (2013.01); *C04B 35/465* (2013.01); *C04B 35/486* (2013.01); *C04B 35/49* (2013.01); *C04B 35/6261* (2013.01); *C04B 35/6264* (2013.01); *C04B 35/62645* (2013.01); *C04B 35/62655* (2013.01); *C04B 35/62695* (2013.01); *C04B 35/63416* (2013.01); *C04B 35/64* (2013.01); *C04B 2235/3206* (2013.01); *C04B 2235/3208* (2013.01); *C04B 2235/3213* (2013.01); *C04B 2235/3215* (2013.01); *C04B 2235/3225* (2013.01); *C04B 2235/3227* (2013.01); *C04B 2235/3234* (2013.01); *C04B 2235/3236* (2013.01); *C04B 2235/3239* (2013.01); *C04B 2235/3241* (2013.01); *C04B 2235/3249* (2013.01); *C04B 2235/3251* (2013.01);
(Continued)

(58) Field of Classification Search
None
See application file for complete search history.

(56) References Cited

U.S. PATENT DOCUMENTS 2,966,719 A * 1/1961 Park, Jr. ................ C04B 35/634
264/650
5,242,873 A * 9/1993 Singh .................... C04B 35/486
501/103
(Continued)

FOREIGN PATENT DOCUMENTS

| CN | 1672283 A | 9/2005 |
|---|---|---|
| JP | 2014138061 A | 7/2014 |

OTHER PUBLICATIONS

Office Action and Search Report dated Aug. 10, 2018 issued by the Taiwan Intellectual Property Office (TIPO) for counterpart application No. 106137344.
(Continued)

*Primary Examiner* — William D Young
(74) *Attorney, Agent, or Firm* — CKC & Partners Co., LLC

(57) ABSTRACT

The present disclosure provides a ceramic sintered body having a favorable dielectric constant. In some embodiments of the present disclosure, the ceramic sintered body includes a semiconductor ceramic phase dispersed in a dielectric ceramic phase, wherein the semiconductor ceramic phase and the dielectric ceramic phase jointly form a percolative composite, and a volume fraction of the semiconductor ceramic phase is close to and less than a percolation threshold.

8 Claims, 29 Drawing Sheets

(51) Int. Cl.
    *C04B 35/634*   (2006.01)
    *C04B 35/64*    (2006.01)
    *C04B 35/49*    (2006.01)
    *C04B 35/465*   (2006.01)
    *C04B 35/486*   (2006.01)
    *C04B 35/46*    (2006.01)

(52) U.S. Cl.
    CPC ............... *C04B 2235/3262* (2013.01); *C04B 2235/3275* (2013.01); *C04B 2235/3279* (2013.01); *C04B 2235/3281* (2013.01); *C04B 2235/3287* (2013.01); *C04B 2235/6025* (2013.01); *C04B 2235/656* (2013.01); *C04B 2235/6567* (2013.01); *C04B 2235/6586* (2013.01); *C04B 2235/663* (2013.01); *C04B 2235/80* (2013.01); *C04B 2235/85* (2013.01)

(56) References Cited

U.S. PATENT DOCUMENTS

| | | | |
|---|---|---|---|
| 6,384,321 B1* | 5/2002 | Mikoshiba | H01G 9/2004 136/256 |
| 7,740,772 B2* | 6/2010 | Gorte | H01M 4/8621 252/500 |
| 2004/0043272 A1 | 3/2004 | Gorte et al. | |
| 2013/0071770 A1* | 3/2013 | Takata | C04B 35/47 429/468 |
| 2013/0170097 A1* | 7/2013 | Sweeney | H01G 9/155 361/502 |
| 2015/0096967 A1* | 4/2015 | Lee | B21J 1/06 219/154 |
| 2015/0340121 A1* | 11/2015 | Ootomo | H01B 3/004 501/89 |
| 2017/0057875 A1* | 3/2017 | Ishizuka | H01B 3/004 |

OTHER PUBLICATIONS

Translated Search Report dated Aug. 10, 2018 issued by the Taiwan Intellectual Property Office (TIPO) for counterpart application No. 106137344.

US 20040043272 is the translation to Foreign Document No. CN1672283A.

Office Action and Search Report dated Feb. 27, 2019 issued by Japan Patent Office for counterpart application No. 2017-208903.

English Translation of Summary of Office Acton dated Feb. 27, 2019.

US Patent Publication No. 20150340121A1 is the corresponding patent translation for Foreign Patent Document JP2014138061A.

* cited by examiner

CERAMIC SINTERED BODY AND PASSIVE COMPONENT INCLUDING THE SAME

BACKGROUND

1. Field of the Disclosure

The present disclosure relates to a ceramic sintered body and a passive component including the same, and more particularly to a ceramic sintered body having a favorable dielectric constant and a passive component including the ceramic sintered body.

2. Description of the Related Art

Passive components, such as capacitors, are usually made of dielectric materials. Generally, a capacitance of a capacitor is related to a dielectric constant of a dielectric material of which the capacitor is made. That is, a higher dielectric constant of the dielectric material results in a higher capacitance of the capacitor. Since the capacitor with reduced size and improved capacitance is desirable, it is necessary to provide a material with improved dielectric constant.

SUMMARY

The present disclosure provides a ceramic sintered body having a favorable dielectric constant.

In some embodiments of the present disclosure, the ceramic sintered body includes a semiconductor ceramic phase dispersed in a dielectric ceramic phase, wherein the semiconductor ceramic phase and the dielectric ceramic phase jointly form a percolative composite, and a volume fraction of the semiconductor ceramic phase is close to and less than a percolation threshold.

The present disclosure further provides a passive component including the aforementioned ceramic sintered body.

DETAILED DESCRIPTION

Figure 1:
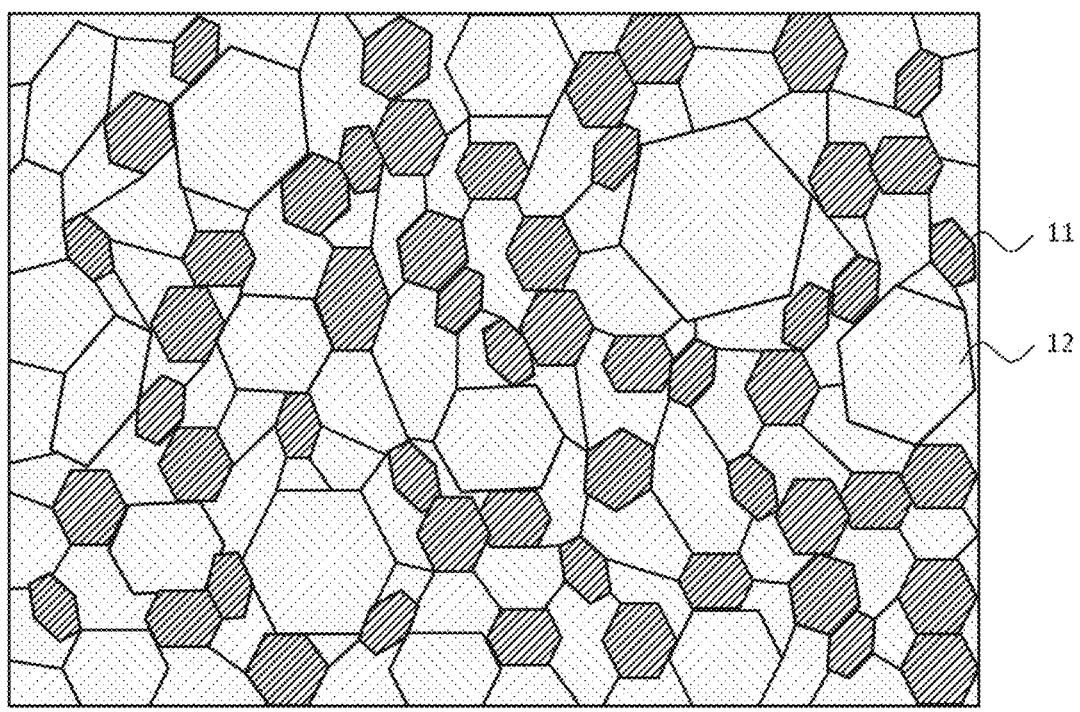
FIG. 1 schematically illustrates a microstructure of a ceramic sintered body according to some embodiment of the present disclosure.

Theoretically, an extremely high dielectric constant can only be expected on ferroelectric materials in a very narrow temperature range close to the ferroelectric-paraelectric phase transition. However, a conventional approach to an acceptable dielectric constant of a capacitor is achieved through a multilayered structure. Specifically, thin layers of ferroelectric ceramic material are placed between conductive layers, forming a multilayered ceramic capacitor (MLCC). In the conventional MLCC, the thickness of the ferroelectric ceramic layers is a critical factor which affects its capacitance. By reducing the thickness of the ferroelectric ceramic layers using smaller grain size of ferroelectric ceramic material, the capacitance of the MLCC can be enlarged. However, ferroelectric ceramic material with smaller grain size exhibits smaller dielectric constant due to the so-called "Size-Effect." The conventional criteria to obtain higher capacitance in MLCC by thinner dielectric layer is theoretically leading to a dead end.

Another approach to an acceptable dielectric constant of a capacitor is achieved through percolative composite, which can be explained according to percolation theory. Generally, "percolation theory" describes the behavior of connected clusters in a random graph. In the capacitor related technical fields, percolation theory can be used to describe the condition of conductive grains forming a current path through a space filled by insulating grains. When conductive grains are mixed with insulating grains, the lowest volume fraction of the conductive grains which is sufficient to form a current path through the space filled by the insulating grains is defined as "percolation threshold." In other words, when the volume fraction of the conductive grains reaches the percolation threshold, a portion of the conductive grains are connected to each other, forming a current path through the space filled by the insulating grains. An increase of volume fraction of conductive grains leads to increase of apparent dielectric constant of the composite. When the volume fraction of the conductive grains is just before the percolation threshold, which means the highest volume fraction of the conductive grains before the percolation threshold, the composite exhibits huge dielectric constant. Percolative threshold power law is described as below.

$$\langle \varepsilon \rangle = \varepsilon_0 \left| \frac{f_c - f}{f_c} \right|^{-q} \quad \begin{array}{l} \varepsilon_0 \text{ is the matrix dielectric constant} \\ f \text{ is the filling factor} \\ f_c \text{ is the percolation threshold} \\ q \text{ is a critical exponent} \end{array}$$

The aforementioned percolative composite uses metal material and dielectric ceramic material as the conductive grains and the insulating grains, respectively. The fine metal grains have large surface energy. When mixing with the dielectric ceramic grains, the metal grains tend to agglomerate together, thus cannot disperse evenly in the mixture. The agglomeration of the metal grains may even worsen when the mixing process is performed in a large scale. Besides, since melting point of metal grains (such as nickel) is generally lower than that of the ceramic grains, the metal grains melt earlier in a sintering process than the insulating grains do, resulting in tremendous particle growth (abnormal grain growth) during the sintering process. Metal grains made of noble metals (such as platinum) with high melting points may be used for avoiding abnormal grain growth during the sintering process, while the cost may correspondingly increase. In light of the above, such percolative composite cannot meet the industrial requirement.

To address at least the above concerns, the present disclosure provides a ceramic sintered body including a semiconductor ceramic phase dispersed in a dielectric ceramic phase, where the semiconductor ceramic phase and the dielectric ceramic phase jointly form a percolative composite, and a volume fraction of the semiconductor ceramic phase is close to and less than a percolation threshold. By using the semiconductor ceramic material as the conductive phase instead of the aforementioned metal material, agglomeration and abnormal grain growth of the conductive phase can be avoided. Thus, such a percolative composite having a favorable dielectric constant can be successfully produced.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

In the present disclosure, the term "a ceramic sintered body" refers to a sintered body made of ceramic materials. The ceramic sintered body may be sintered from two or more ceramic materials. For example, the ceramic sintered body can be sintered from a plurality of ceramic grains, and these ceramic grains are engaged together to form a monolithic structure.

In the present disclosure, the term "a phase" refers to a region of space, throughout which all physical properties of a material are essentially uniform. Examples of physical properties include but are not limited to density, index of refraction, magnetization, conductivity, dielectric constant, and chemical composition. Preferably, a phase is a region of material that is physically and chemically uniform and physically distinct. For example, in some embodiments of the present disclosure, the ceramic sintered body includes the semiconductor ceramic phase dispersed in the dielectric ceramic phase. The semiconductor ceramic phase is substantially made of a material having a conductivity which is essentially uniform within the semiconductor ceramic phase. Similarly, the dielectric ceramic phase is substantially made of another material having a conductivity which is essentially uniform within the dielectric ceramic phase. Furthermore, the conductivity of the semiconductor ceramic phase is different from the conductivity of the dielectric ceramic phase.

In some embodiments of the present disclosure, the dielectric ceramic phase is rather like a continuous phase when comparing to the semiconductor ceramic phase. On the other hand, the semiconductor ceramic phase is rather like a dispersed phase which is dispersed in the dielectric ceramic phase. For illustration purpose, FIG. 1 shows a microstructure of the ceramic sintered body according to some embodiment of the present disclosure. The ceramic phase 11 is dispersed in the dielectric ceramic phase 12, forming the percolative composite. It is noteworthy that the ceramic sintered body according to some embodiments of the present disclosure may include more than one semiconductor ceramic phase and/or more than one dielectric ceramic phase.

In some embodiments of the present disclosure, the dielectric ceramic phase refers to a phase consisting of a ceramic material having dielectric properties. For example, such phase has a resistivity higher than about $10^8$ Ω-cm.

In some embodiments of the present disclosure, the semiconductor ceramic phase refers to a phase consisting of a ceramic material having semiconducting properties. For example, such phase may be an n-type semiconductor with a conductivity higher than about 0.5 S/m, or higher than about 1.0 S/m.

In some embodiments of the present disclosure, a percolation capacitance refers to a highest volume fraction of the semiconductor ceramic phase which is just before sufficient to form a current path through the dielectric ceramic phase. A percolation threshold refers to a volume fraction of the semiconductor ceramic phase which is just sufficient to form a current path through the dielectric ceramic phase. The exact value of the percolative threshold may depend on the materials, the grain sizes of the materials of semiconductor ceramic phase and the dielectric ceramic phase, and the sintering temperature of the ceramic sintered body. The percolative threshold can be obtained through measurement or simulation, which can be readily appreciated by a person of ordinary skill in the art.

In the present disclosure, said percolative composite has the volume fraction of the semiconductor ceramic phase being very close to the percolation threshold. The volume fraction of the semiconductor ceramic phase in the percolative composite could be a few percent less than the percolative threshold.

The dielectric constant of ceramic sintered body (including the dielectric ceramic phase and the semiconductor ceramic phase) diverges at the percolation threshold. Hence, since the dielectric ceramic phase and the semiconductor ceramic phase jointly form the percolative structure, and the volume fraction of the semiconductor ceramic phase is very close to the percolation threshold, the ceramic sintered body can be provided with an improved dielectric constant. That is, the dielectric constant of the ceramic sintered body increases exponentially when the volume fraction of the semiconductor ceramic phase increases in a region near the percolation threshold.

In some embodiments, the volume fraction of the semiconductor ceramic phase in the percolative composite may be about 0.05% to about 20% less than the percolative threshold. For example, if the percolation threshold under a particular condition is 30%, the volume fraction of the semiconductor ceramic phase in the sub-percolative composite under the same condition may be about 30-0.05% to about 30-20%. In some embodiments, the volume fraction of the semiconductor ceramic phase in the percolative composite may be about 0.05% to about 10%, about 0.05% to about 5%, or about 0.05% to about 3% less than the percolative threshold. In some embodiments of the present disclosure, a volume fraction of the semiconductor ceramic phase is close to and less than a percolation threshold. In some embodiments, the volume fraction of the semiconductor ceramic phase may be about 0.999 times to about 0.33 times the exact value of the percolation threshold. For example, if the percolation threshold under a particular condition is 30%, the volume fraction of the semiconductor ceramic phase in the sub-percolative composite under the same condition may be about (30*0.999)% to about (30*0.33)%. In some embodiments, the volume fraction of the semiconductor ceramic phase may be about 0.999 times to about 0.65 times, about 0.999 times to about 0.75 times, about 0.999 times to about 0.85, or about 0.999 times to about 0.9 times the exact value of the percolation threshold.

In some embodiments, for example, percolation threshold under a predetermined condition can be calculated. A model for calculation of percolation threshold under a predetermined condition can be seen at least in C. D. Lorenz and R. M. Ziff, *J. Chem. Phys.* 114 3659 (2001), S. Kirkpatrick, *Rev. Mod. Phys.* 45 574 (1973), D. Stauffer, *Phys Rep.* 54 1 (1979), and T. G. Castner, et al., *Phys. Rev. Lett.* 34 1627 (1975).

The exact value of the volume fraction of the semiconductor ceramic phase in the sub-percolative composite may be strongly depended upon grain sizes of semiconductor ceramic phase and dielectric ceramic phase, and their geometrical distribution. For example, if the grain size of the dielectric ceramics phase is much smaller than the grain size of the semiconductor ceramic phase, and if they are well homogeneously distributed, the volume fraction of the semiconductor ceramic phase could show larger value. On the other hand, if the grain size of dielectric ceramic phase is much larger than the grain size of semiconductor ceramic phase, and if they are well geometrically distributed, the volume fraction of the semiconductor ceramic phase could show smaller value. However, in some embodiments, if the grain size of the semiconductor ceramic phase is about 3.0 micrometers and the grain size of the dielectric ceramic phase is about 0.2 micrometer, the volume fraction of the semiconductor ceramic phase is preferably about 5% to about 60%; more preferably about 15% to about 40%; still more preferably about 20% to about 35%. If the grain size of semiconductor ceramic phase is about 1.0 micrometers and the grain size of the dielectric ceramic phase is about 0.2 micrometers, the volume fraction of the semiconductor ceramic phase is preferably about 5% to 60%, more preferably 15% to 40%, still more preferably about 25% to 35%. And if the grain size of semiconductor ceramic phase is 0.2 micrometers and the grain size of the dielectric ceramic phase is 0.1 micrometers, the volume fraction of the semiconductor ceramic phase is 5% to 55%, more preferably 15% to 35%, still more preferably about 20% to 30%. However, in some embodiments, the shape of the semiconductor ceramic phase may drastically affect the exact value of percolation threshold.

For example, the material of the dielectric ceramic phase according to some embodiments of the present disclosure is a first compound non-doped or doped with a first additive, and the first compound includes $CaZrTi_2O_7$ (zirconolite), $CaZrO_3$, $SrZrO_2$, $BaZrO_3$, $TiO_2$ (rutile), $ZrO_2$, or solid solutions thereof (e.g., the solid solution thereof may include $Ti_{1-x}Zr_xO_2$, where x is a rational number between 0 and 1; or $Ca_{1-x}Sr_xZrO_3$, where x is a rational number between 0 and 1). In the case that the dielectric ceramic phase includes zirconolite, it is advantageous for the dielectric ceramic phase to be clearly separated from the semiconductor ceramic phase.

For example, the material of the semiconductor ceramic phase according to some embodiments of the present disclosure is a second compound non-doped or doped with a second additive, and the second compound includes perovskite materials. As can be readily appreciated by a person of ordinary skill in the art, "perovskite materials" refers to a class of compounds which have the same type of crystal structure of $^{XII}A^{2+VI}B^{4+}X^{2-}_3$. "A" and "B" are two cations of very different sizes, and "X" is an anion that bonds to both. The "A" atoms are larger than the "B" atoms. The ideal cubic-symmetry structure has the "B" cation in 6-fold coordination, surrounded by an octahedron of anions, and the "A" cation in 12-fold cuboctahedral coordination. In some embodiments of the present disclosure, the perovskite materials include strontium titanate ($SrTiO_3$), barium titanate ($BaTiO_3$), calcium titanate ($CaTiO_3$), nickel titanate ($NiTiO_3$), manganese titanate ($MnTiO_3$), cobalt titanate ($CoTiO_3$), copper titanate ($CuTiO_3$), magnesium titanate ($MgTiO_3$) or complexes thereof. Preferably, the perovskite materials can be in a reduced state, such as reduced by, for example, reducing atmosphere. In some embodiments of the present disclosure, the material of the semiconductor ceramic phase includes reduced $TiO_2$ (rutile), i.e., $TiO_{2-x}$; oxygen deficient state semiconductor. The reduced $TiO_2$ (rutile) can be reduced by, for example, reducing atmosphere.

Even though there is a lattice mismatch among perovskite materials, $CaZrTi_2O_7$, $TiO_2$ (rutile) and $ZrO_2$, such lattice mismatch can be overcome since mutual diffusion of Ti occurs between perovskite materials (with the "B" of $^{XII}A^{2+VI}B^{4+}X^{2-}_3$ being Ti) and $CaZrTi_2O_7$, $TiO_2$ (rutile), and mutual diffusion of Zr occurs between $CaZrTi_2O_7$, $CaZrO_3$, $SrZrO_3$, $BaZrO_3$ and $ZrO_2$ during the sintering process. Accordingly, when the above listed materials are used as the semiconductor ceramic phase and the dielectric ceramic phase, they can be sintered together without cracks, rupture, brittle failure and fracture, providing a favorable structural strength of the ceramic sintered body.

Furthermore, in some embodiments of the present disclosure, the dielectric ceramic phase is further doped with the first additive. For example, the first additive is an acceptor-type additive such as V, Nb, Cr. Besides, the additive may be manganese compounds, magnesium compounds, silicate compounds, tungsten compounds or alumina compounds to increase the dielectric properties. In some embodiments of the present disclosure, the dielectric ceramic phase can further be doped with a dopant such as $MnO_2$, $MgO$ or $WO_3$. Such dopant can enhance the dielectric properties of the dielectric ceramic phase, e.g. increasing the resistivity and reliability of the dielectric ceramic phase.

Similarly, in some embodiments of the present disclosure, the semiconductor ceramic phase is further doped with the second additive. For example, the second additive is a donor-type additive such as Y, Nb or La, thus forming $Y_2O_3$, $Nb_2O_5$, $La_2O_3$ in the semiconductor ceramic phase. Such additive can enhance the semiconducting properties of the semiconductor ceramic phase, e.g. increase the conductivity of the semiconductor ceramic phase. The perovskite compounds doped with the donor additive and reduced can form a high donor density n-type semiconducting material.

The present disclosure further provides a passive component including the aforementioned ceramic sintered body. In the present disclosure, the passive component is an electronic component which does not require energy to operate, except for the available alternating current (AC) circuit to which it is connected to. The passive component is not capable of power gain and is not a source of energy. For example, the passive component includes two-terminal components, such as resistors, capacitors, inductors, and transformers.

The present disclosure may relate to a method for manufacturing the aforementioned ceramic sintered body. The method includes mixing semiconductor ceramic grains and dielectric ceramic grains to obtain a mixture, and sintering the mixture under a neutral atmosphere.

In some embodiments of the present disclosure, the semiconductor ceramic grains are made of the same material as the semiconductor ceramic phase described above. However, it is noteworthy that $TiO_2$ grains can be provided in both rutile and anatase structure. The size of the semiconductor ceramic grains may be about 0.1 micrometer to about 5 micrometers, preferably about 0.2 micrometer to about 2 micrometers. Similarly, the dielectric ceramic grains are made of the same material as the dielectric phase describe above. The size of the dielectric ceramic grains may be about 0.1 micrometer to about 5 micrometers, preferably about 0.2 micrometer to about 2 micrometers. Mixing of the semiconductor ceramic grains and the dielectric ceramic grains can be achieved by, for example, a bead miller. After mixing, the mixture is sintered under the neutral atmosphere, such as $N_2$, He, Ar, etc. The sintering temperature may be, for example, about 1100° C. to about 1500° C.

In some embodiments of the present disclosure, the method further includes mixing the semiconductor grains, the dielectric grains and a binder in a solvent, and removing the binder and the solvent before sintering. For example, the binder includes polyvinyl alcohols (PVA), polyacrylate and ethyl cellulose. The solvent includes ethanol, toluene, methyl ethyl ketone (MEK), diethylene glycol monobutyl ether (BC) and butyl carbitol acetate (BCA), and a combination thereof. Other sintering aids, such as $SiO_2$, $GeO_2$, $B_2O_3$, etc., can also be added for increasing sintering density and lowering sintering temperature. The solvent refers to a liquid for mixing the semiconductor ceramic grains and the dielectric ceramic grains. Preferably, the solvent does not react with the semiconductor ceramic grains, the dielectric ceramic grains and/or the binder. For example, the solvent includes alcohols, ethers, etc.

The following Examples are given for the purpose of illustration only and are not intended to limit the scope of the present invention

Figure 2:
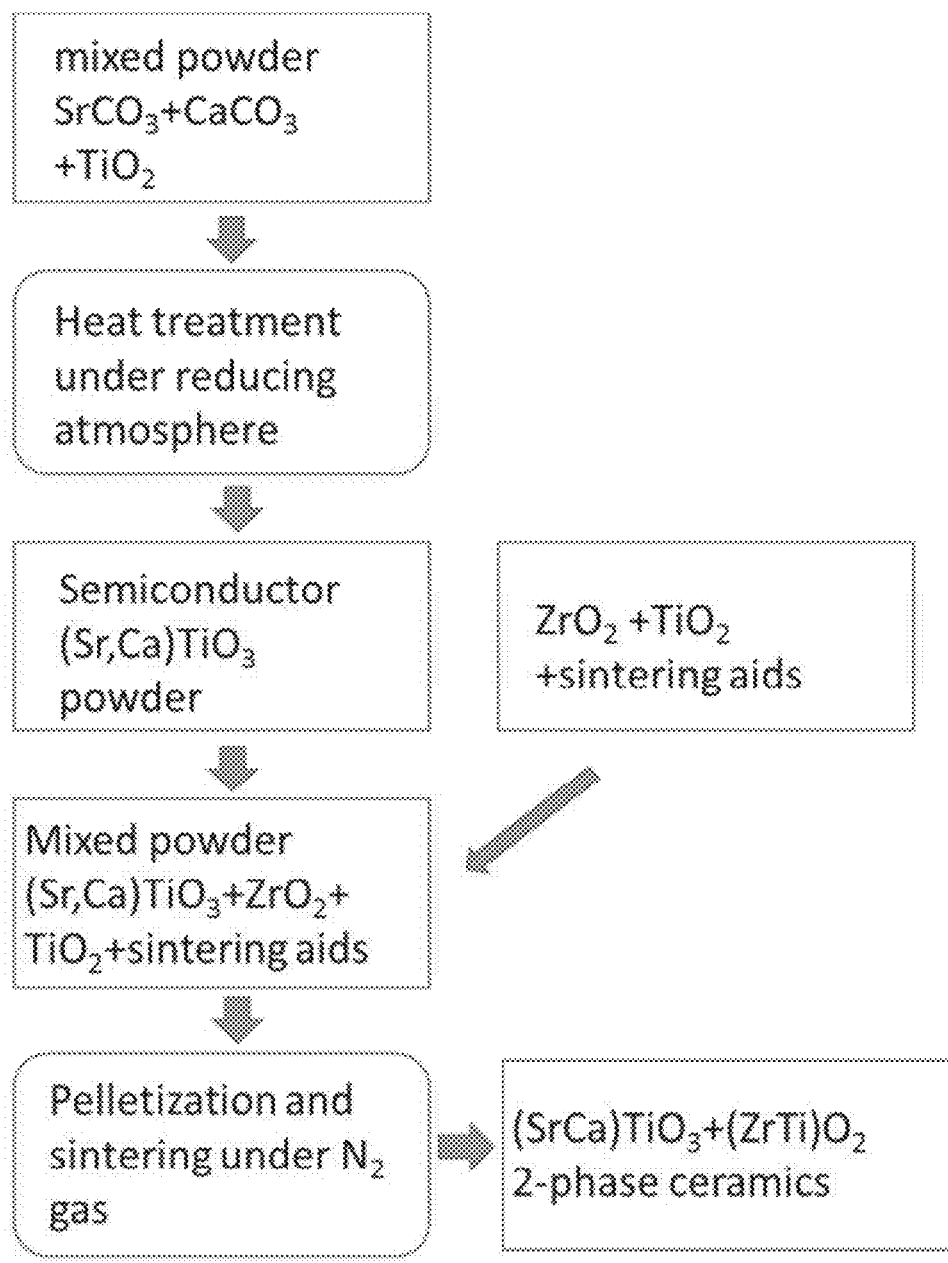
FIG. 2 shows a schematic process flow of Example 1.

Example 1: Ceramic Sintered Body Including $TiO_2$—$ZrO_2$ Solid Solution as the Dielectric Ceramic Phase and $SrTiO_3$—$CaTiO_3$ Solid-Solution as the Semiconductor Ceramic Phase FIG. 2 shows a schematic process flow of Example 1. 0.075 mole of strontium carbonate ($SrCO_3$), 0.075 mole of calcium carbonate ($CaCO_3$) and 0.15 mole of $TiO_2$ (rutile) were mixed by bead miller (zirconium oxide beads, with a diameter f 0.1 mm) in ethanol. After mixing, the mixed powder was dried in nitrogen gas flow. The obtained mixture was dry-ground and calcined at 1,000° C. in $N_2$+$H_2$ (95%+5%) gas flow for 5 hours to obtain a black colored semiconductor ($Sr_{0.5}Ca_{0.5}$)$TiO_3$ powder. 0.5 mole of zirconium oxide ($ZrO_2$) and 0.5 mole of titanium oxide ($TiO_2$) (rutile) were added to the dry-ground powder and mixed again by bead miller.

100 parts by weight of the powder thus formed were mixed and milled in ethanol, and were then mixed with 15 parts by weight of a PVA binder, 0.1 part by weight of $SiO_2$ and 0.05 part by weight of $Al_2O_3$ to form a slurry. The slurry was coated on a polyethylene terephthalate carrier tape to form a green sheet using a coating machine. The green sheet was punched to form a plurality of pellets. The pellets were heated for 60 minutes at a partial pressure of oxygen greater than 0.015 atm and a temperature of 550° C. to remove the organic binder. The pellets were then sintered at a temperature of 1250° C. for 30 minutes under an atmosphere containing $N_2$ to form a ceramic sintered body. The theoretical percolation threshold of the above condition is about 28.95%, and the volume fraction of the semiconductor ceramic phase ($SrTiO_3$—$CaTiO_3$) in the ceramic sintered body is about 27%. To verify the homogenous mixing state of semiconductor ceramic grains and dielectric ceramic grains in the sintered ceramic body, the samples were respectively re-oxidized for 30 minutes at 800° C., 900° C. and 1000° C. in air before measurement of the dielectric properties. During re-oxidation, the semiconductor ceramic grains may be oxidized from the grain boundary area by oxygen diffusion at the grain boundaries. Meanwhile, in the dielectric ceramics grains, oxygen diffusion also occurs at the grain boundaries. An appropriate re-oxidation condition may enhance the properties of the sintered ceramic body. However, under higher re-oxidation temperature, oxygen diffusion occurs not only at the grain boundaries, but also at the bulk of grains. The strong oxygen diffusion causes degradation of the semiconductor ceramic grains, thus decreasing the conductivity thereof. The obtained sintered bodies were polished 100 micrometers in depth from both sides to deposit Au electrode for dielectric measurement.

Figure 3A:
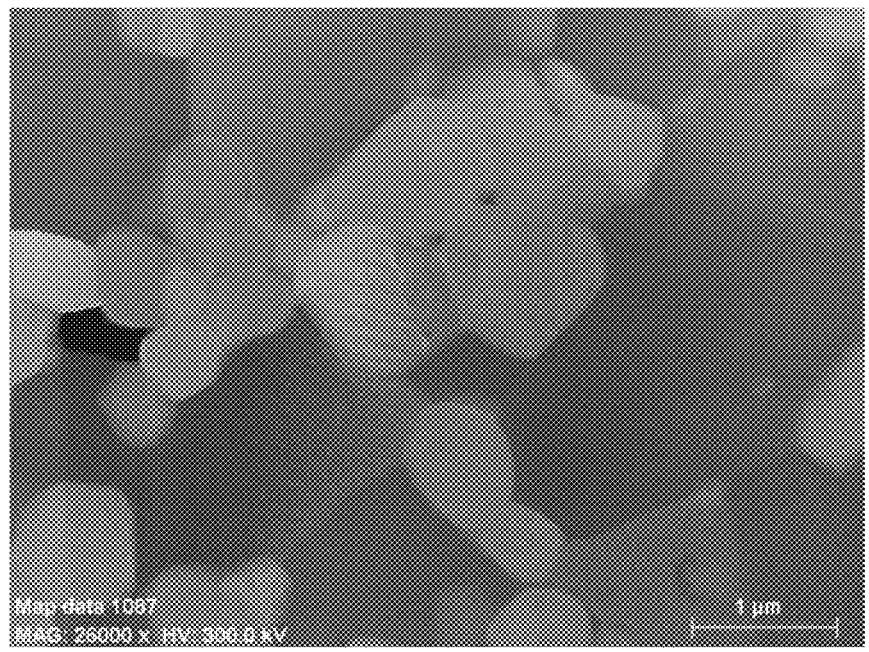
FIG. 3A shows a high-angle annular dark-filed (HAADF) image of the ceramic sintered body in Example 1.
Figure 3B:
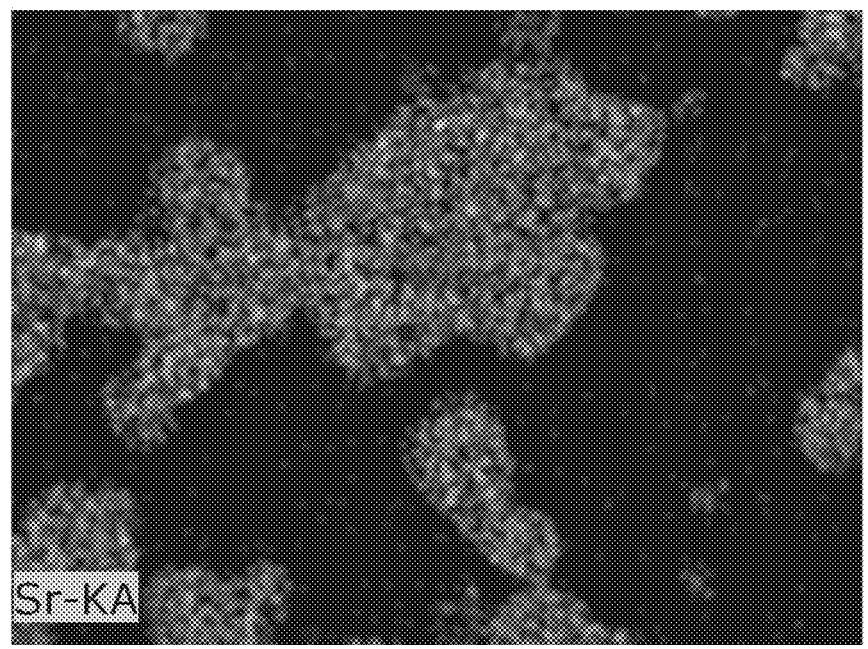
FIG. 3B shows STEM-EDX chemical analysis of Sr in the ceramic sintered body of Example 1.
Figure 3C:
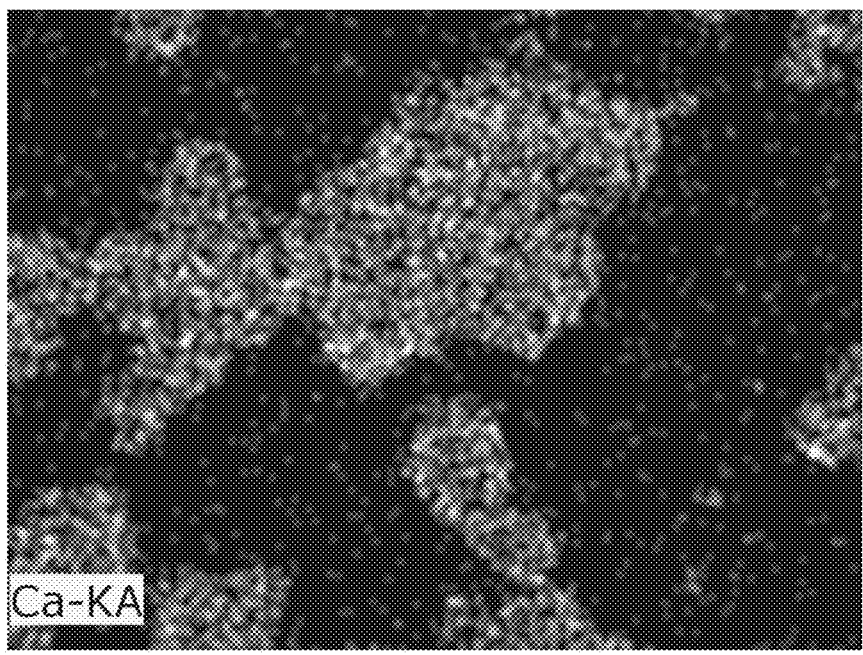
FIG. 3C shows STEM-EDX chemical analysis of Ca in the ceramic sintered body of Example 1.
Figure 3D:
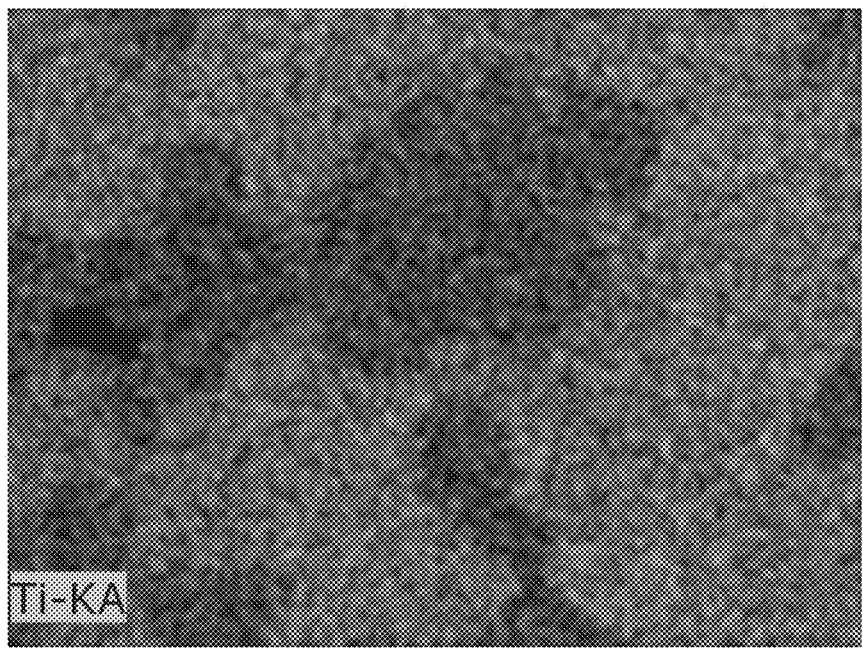
FIG. 3D shows STEM-EDX chemical analysis of Ti in the ceramic sintered body of Example 1.
Figure 3E:
FIG. 3E shows STEM-EDX chemical analysis of Zr in the ceramic sintered body of Example 1.

FIG. 3A shows a high-angle annular dark-filed (HAADF) image of the ceramic sintered body in Example 1. The contrast differences of the image indicate at least a first ceramic phase (the brighter grains) and a second ceramic phase (the darker grains). Further, the STEM-EDX chemical analysis (FIG. 3B to FIG. 3E) proves the existence of the first ceramic phase (Sr—Ca—Ti) and the second ceramic phase (Ti—Zr).

Figure 4A:
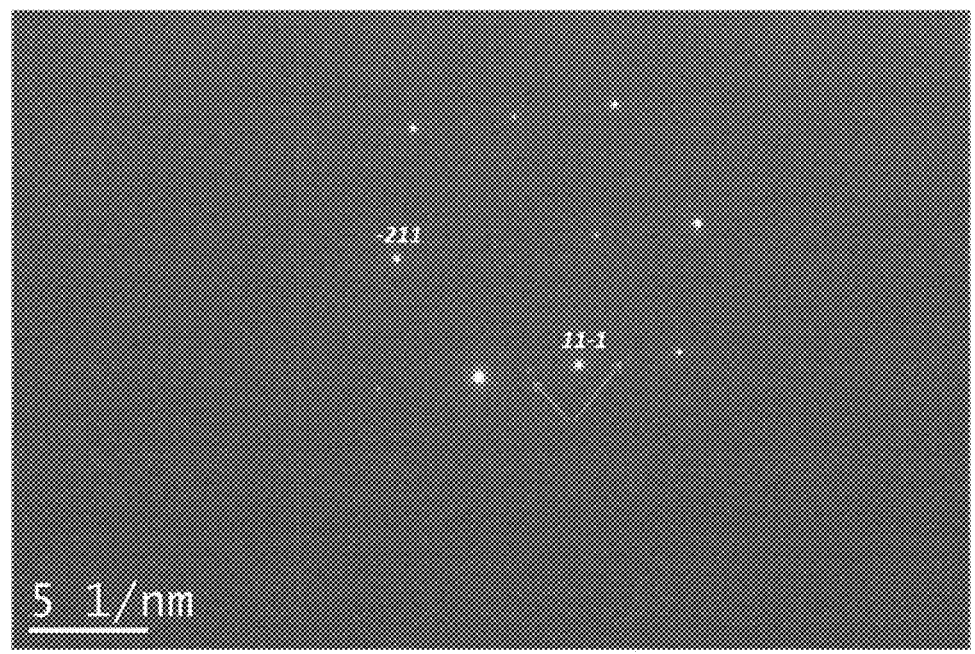
FIG. 4A shows a selected area electron diffraction (SAED) pattern obtained from the first ceramic phase (the brighter grains exhibiting Sr, Ca and Ti in the STEM-EDX chemical analysis) in the ceramic sintered body of Example 1.
Figure 4B:
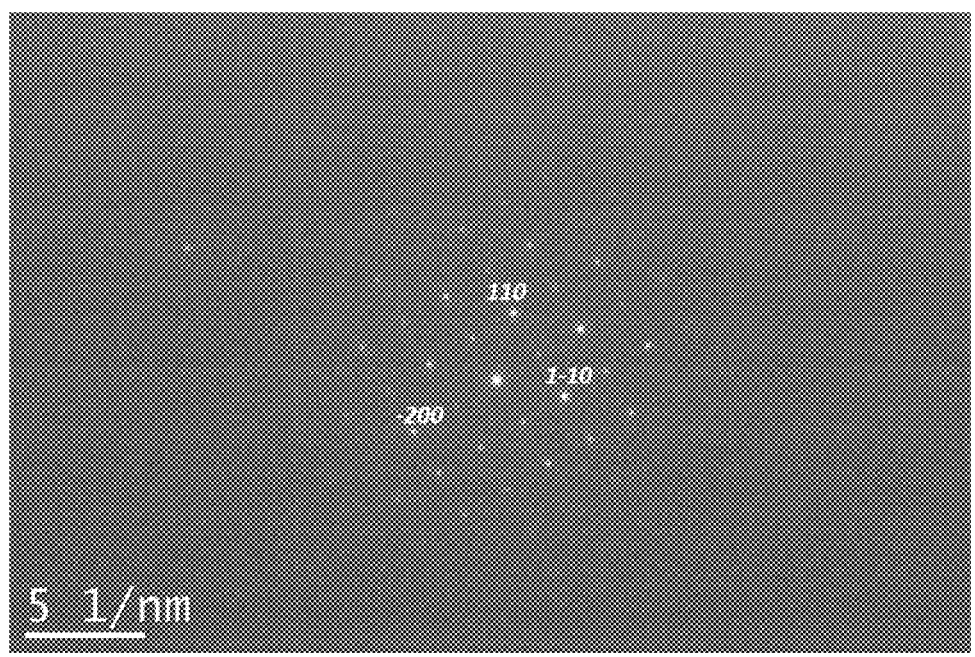
FIG. 4B shows a selected area electron diffraction (SAED) pattern obtained from the second ceramic phase (the darker grains exhibiting Ti and Zr in the STEM-EDX chemical analysis) in the ceramic sintered body of Example 1.

FIG. 4A shows a selected area electron diffraction pattern (SAED) obtained from the first ceramic phase (brighter grains exhibiting Sr, Ca and Ti in the STEM-EDX chemical analysis). The result indicates that the first ceramic phase (brighter grains) is (213) ($Sr_{0.5}Ca_{0.5}$)$Ti_{0.3}$. FIG. 4B shows a selected area electron diffraction pattern (SAED) obtained from the second ceramic phase (the darker grains exhibiting Ti and Zr in the STEM-EDX chemical analysis). The result indicates that the second ceramic phase (the darker grains) is (001) $TiO_2$ (rutile), and is deduced as rutile structure $TiO_2$—$ZrO_2$ solid solution.

Figure 5:
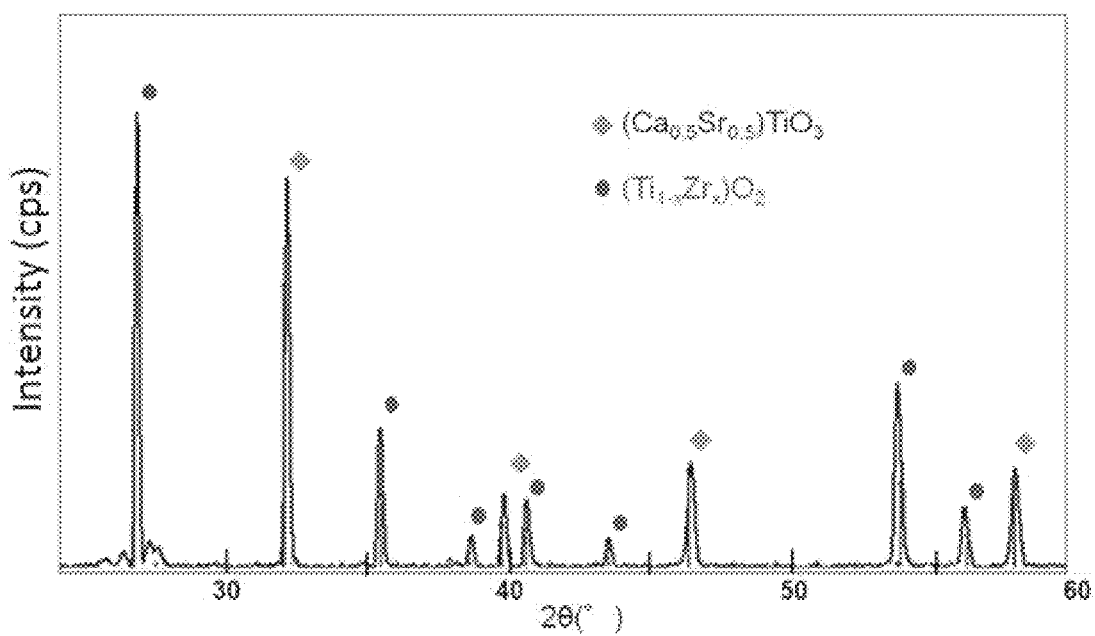
FIG. 5 shows an x-ray diffraction (XRD) pattern of the ceramic sintered body in Example 1.

FIG. 5 shows a XRD (x-ray diffraction) of the ceramic sintered body in Example 1. The peaks also reveal the existence of the first ceramic phase (i.e., ($Sr_{0.5}Ca_{0.5}$)$TiO_3$ phase) and the second ceramic phase (i.e., rutile structure $TiO_2$—$ZrO_2$ solid solution phase) in the ceramic sintered body.

Figure 6A:
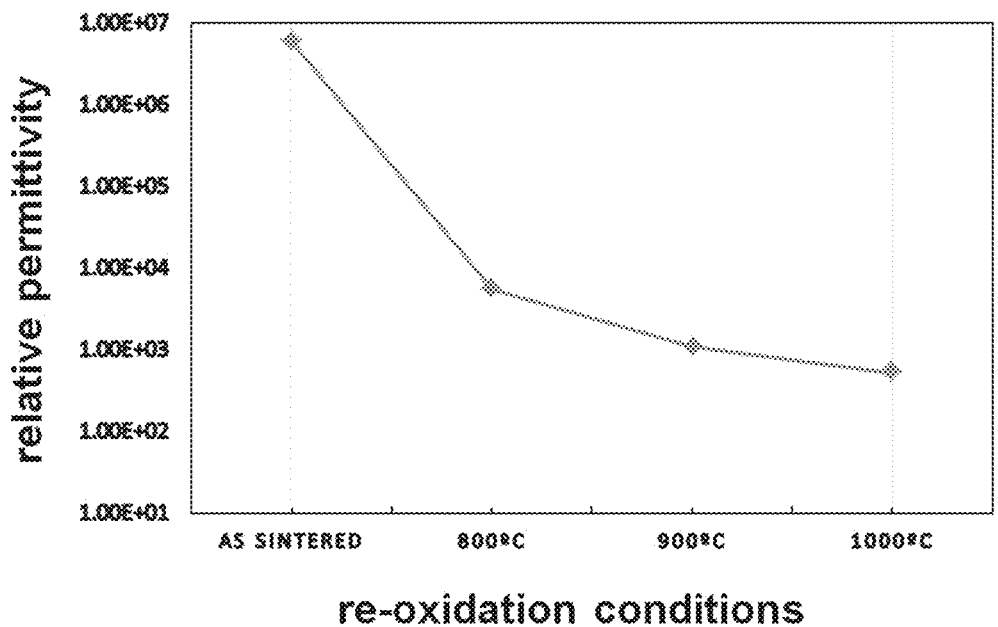
FIG. 6A shows relative dielectric constant of the ceramic sintered body in Example 1 under several different re-oxidation conditions.
Figure 6B:
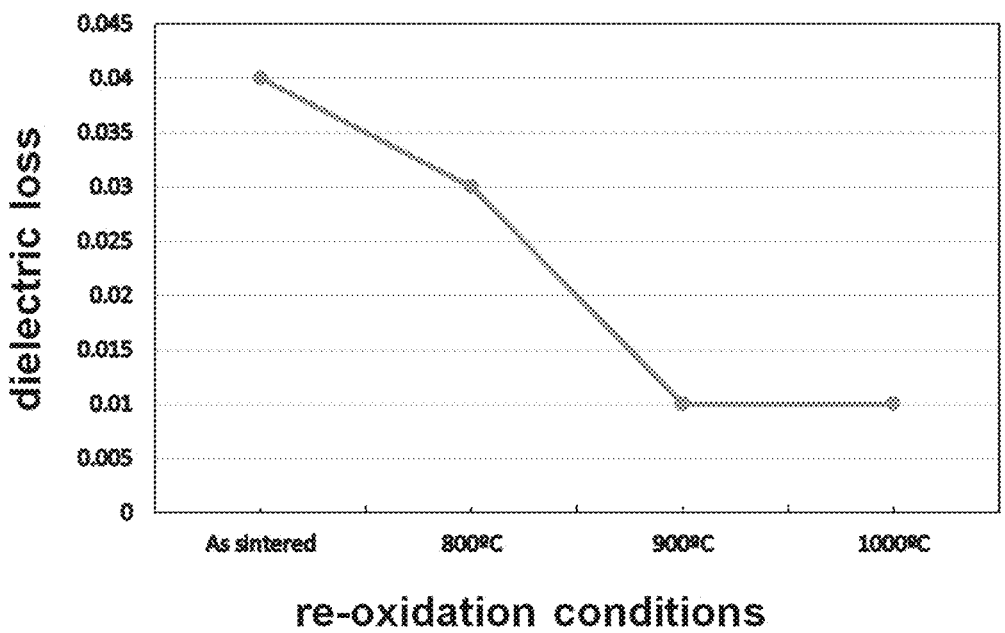
FIG. 6B shows dielectric loss of the ceramic sintered body in Example 1 under several different re-oxidation conditions.
Figure 6C:
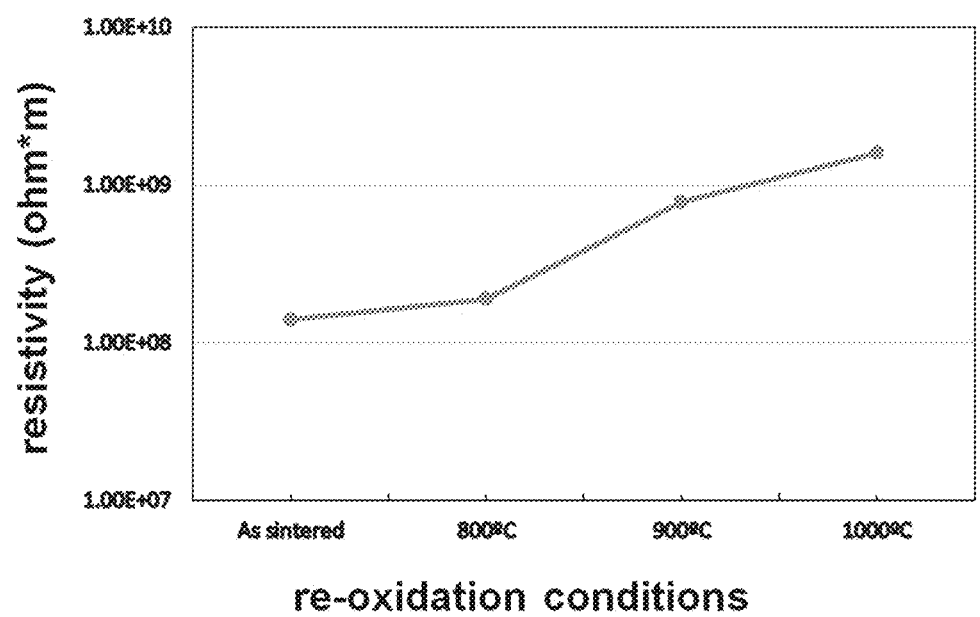
FIG. 6C shows resistivity of the ceramic sintered body in Example 1 under several different re-oxidation conditions.

FIG. 6A, FIG. 6B and FIG. 6C show relative dielectric constant, dielectric loss and resistivity of the ceramic sintered body in Example 1 under several different re-oxidation conditions. The decreases of dielectric constant and dielectric loss, and the increase of resistivity suggest increase of re-oxidation of ($Sr_{0.5}Ca_{0.5}$)$TiO_3$ semiconductor phase. The obtained sintered ceramic body (mark as "as sintered" in FIGS. 6A to 6D) has a dielectric constant significantly larger than that of ($Sr_{0.5}Ca_{0.5}$)$TiO_3$ and $TiO_2$—$ZrO_2$, and the dielectric constant decreases corresponding to the increase of re-oxidation temperature. The decrease of dielectric constant depending upon the oxidation level of semiconductor ceramic phase (($Sr_{0.5}Ca_{0.5}$)$TiO_3$) indicates that the sintered ceramic body is a sub-percolative composite. That is, the huge apparent relative dielectric constant stems from the sub-percolative structure.

Accordingly, the above analysis results show that the ceramic sintered body in Example 1 includes a semiconductor ceramic phase (i.e., ($Sr_{0.5}Ca_{0.5}$)$TiO_3$ phase) dispersed in a dielectric ceramic phase (i.e., rutile structure $TiO_2$—$ZrO_2$ solid solution phase), wherein the semiconductor ceramic phase and the dielectric ceramic phase jointly form a sub-percolative composite.

Figure 7:
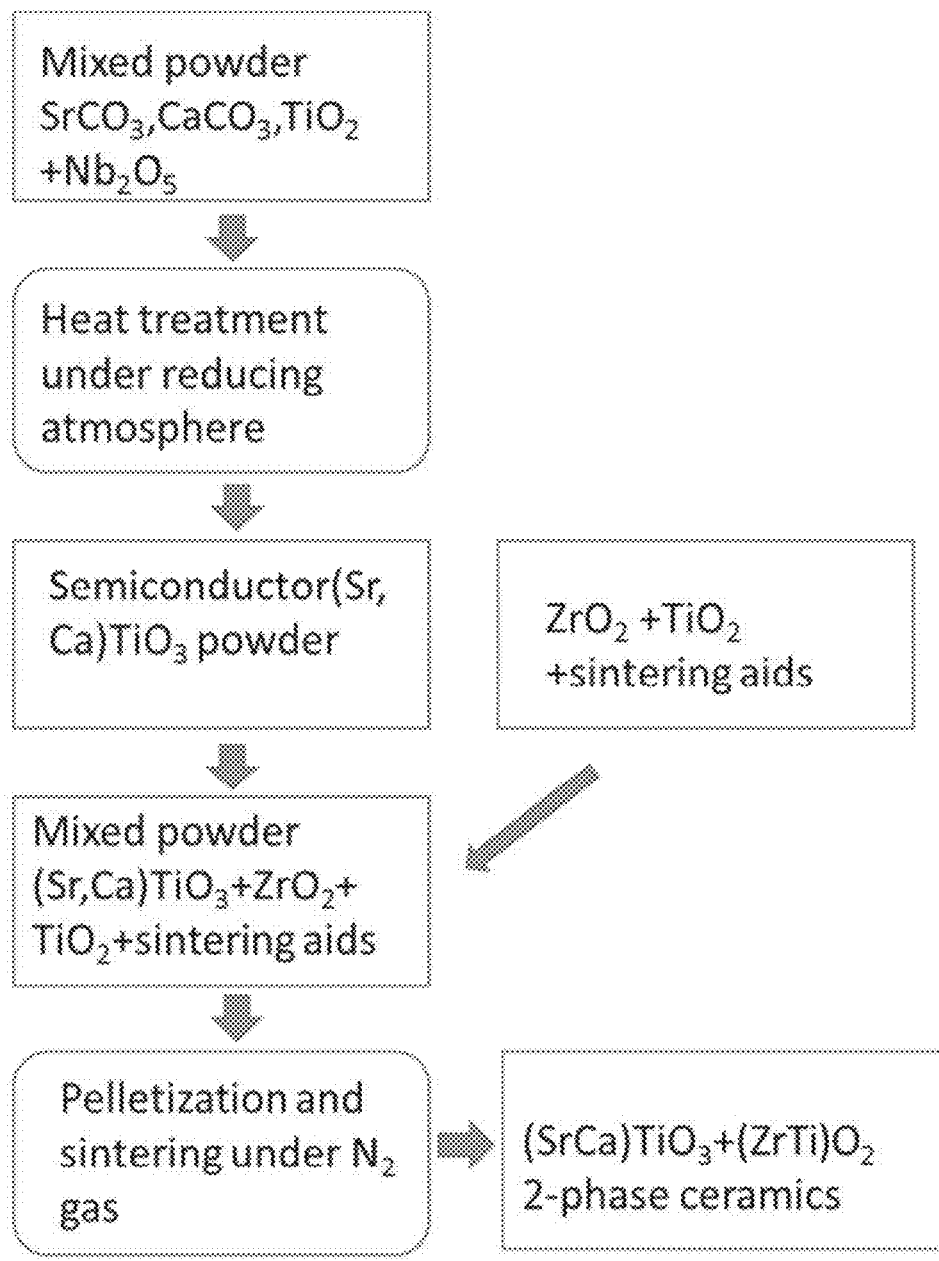
FIG. 7 shows a schematic process flow of Example 2.

Example 2: Ceramic Sintered Body Including $TiO_2$—$ZrO_2$ Solid Solution as the Dielectric Ceramic Phase, and $SrTiO_3$—$CaTiO_3$ Solid-Solution as the Semiconductor Ceramic Phase FIG. 7 shows a schematic process flow of Example 2. 0.11 mole of strontium carbonate ($SrCO_3$), 0.046 mole of calcium carbonate ($CaCO_3$) and 0.154 mole of $TiO_2$ (rutile) were mixed by bead miller (zirconium oxide beads, with a diameter f 0.1 mm) in ethanol. After mixing, the mixed powder was dried in nitrogen gas flow. The obtained mixture was dry-ground and calcined at 1,100° C. in $N_2$+$H_2$ (95%+5%) gas flow for 5 hours to obtain a black colored semiconductor ($Sr_{0.7}Ca_{0.3}$)$TiO_3$ powder. 0.7 mole of zirconium oxide ($ZrO_2$) and 0.3 mole of titanium oxide ($TiO_2$) (rutile) were added to the dry-ground powder and mixed again by bead miller.

100 parts by weight of the powder thus formed were milled in a solvent containing 20% MEK and 80% BCA (v/v), and were then mixed with 15 parts by weight of ethyl cellulose, 0.3 part by weight of $CaSiO_3$, 0.1 part by weight of $GeO_2$ and 0.05 part by weight of $Al_2O_3$ to form a slurry.

The slurry was coated on a polyethylene terephthalate (PET) carrier tape to form a green sheet using a coating machine. The green sheet was punched to form a plurality of pellets. The pellets were heated for 60 minutes at a partial pressure of oxygen greater than 0.015 atm and a temperature of 450° C. to remove the binder. The pellets were then sintered at a temperature of 1300° C. for 30 minutes under an atmosphere containing $N_2$ to form a ceramic sintered body. The theoretical percolation threshold of the above condition is about 28.95%, and the volume fraction of the semiconductor ceramic phase ($SrTiO_3$—$CaTiO_3$) in the ceramic sintered body is about 27.3%. To verify the homogenous mixing state of semiconductor ceramic grains and dielectric ceramic grains in the sintered ceramic body, the samples were respectively re-oxidized for 30 minutes at 800° C., 900° C. and 1000° C. in air before measurement of the dielectric properties. The obtained sintered bodies were polished 100 micrometers in depth from both sides to deposit Au electrode for dielectric measurement.

Figure 8A:
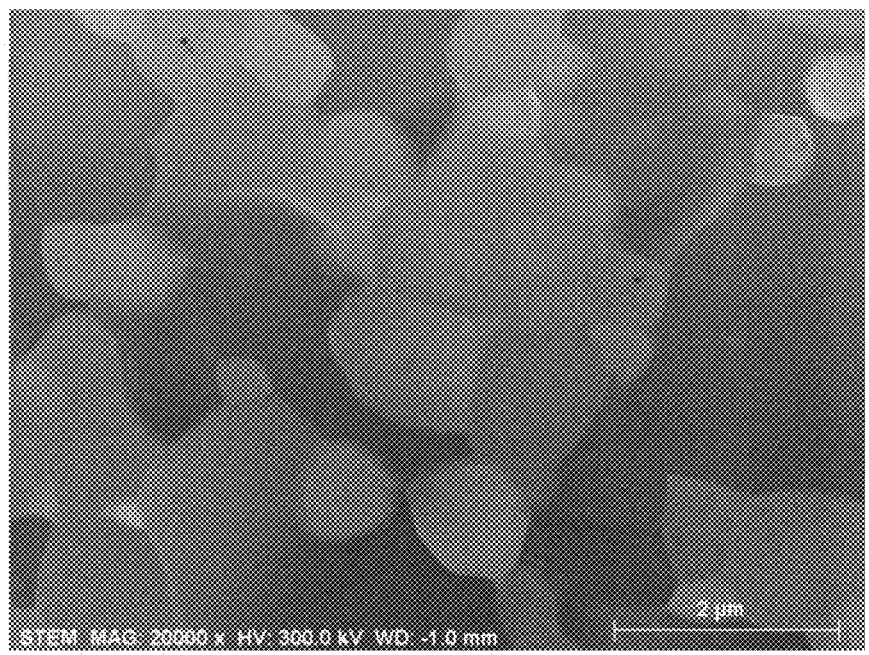
FIG. 8A shows a high-angle annular dark-filed (HAADF) image of the ceramic sintered body in Example 2.
Figure 8B:
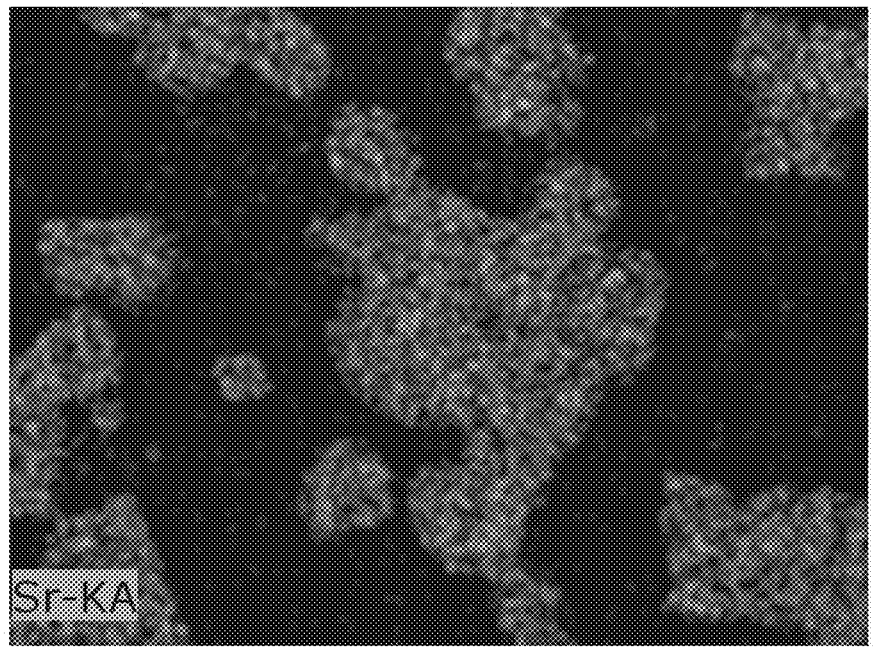
FIG. 8B shows STEM-EDX chemical analysis of Sr in the ceramic sintered body of Example 2.
Figure 8C:
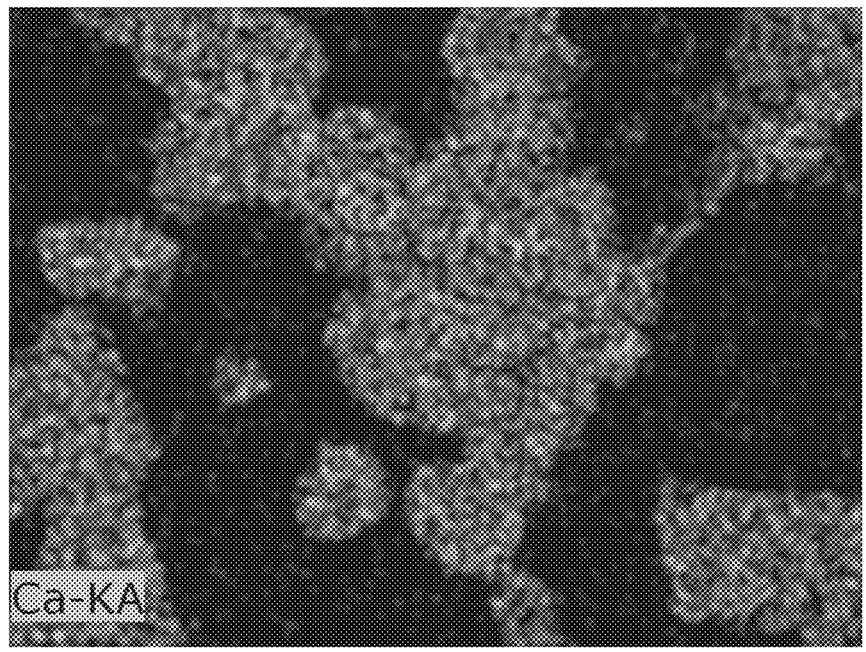
FIG. 8C shows STEM-EDX chemical analysis of Ca in the ceramic sintered body of Example 2.
Figure 8D:
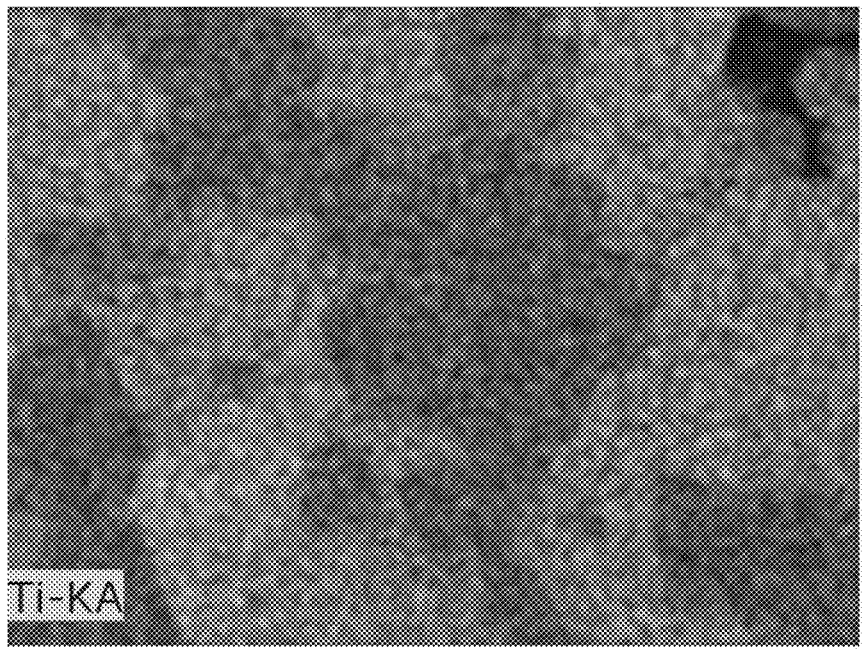
FIG. 8D shows STEM-EDX chemical analysis of Ti in the ceramic sintered body of Example 2.
Figure 8E:
FIG. 8E shows STEM-EDX chemical analysis of Zr in the ceramic sintered body of Example 2.

FIG. 8A shows a high-angle annular dark-filed (HAADF) image of the ceramic sintered body in Example 2. The contrast differences of the image indicate several ceramic phases. Further, the STEM-EDX chemical analysis (FIG. 8B to FIG. 8E) proves the existence of a first ceramic phase (Sr—Ca—Ti), a second ceramic phase (Ti—Zr), and a third ceramic phase (Ca—Zr—Ti).

Figure 9A:
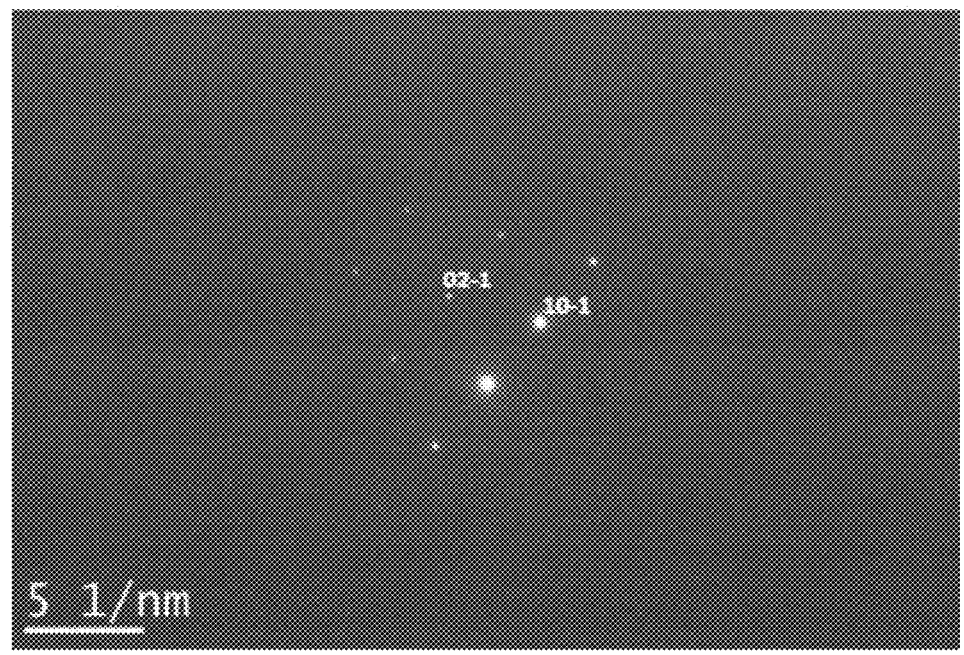
FIG. 9A shows a selected area electron diffraction (SAED) pattern obtained from the first ceramic phase (the grains exhibiting Sr, Ca and Ti in the STEM-EDX chemical analysis) in the ceramic sintered body of Example 2.
Figure 9B:
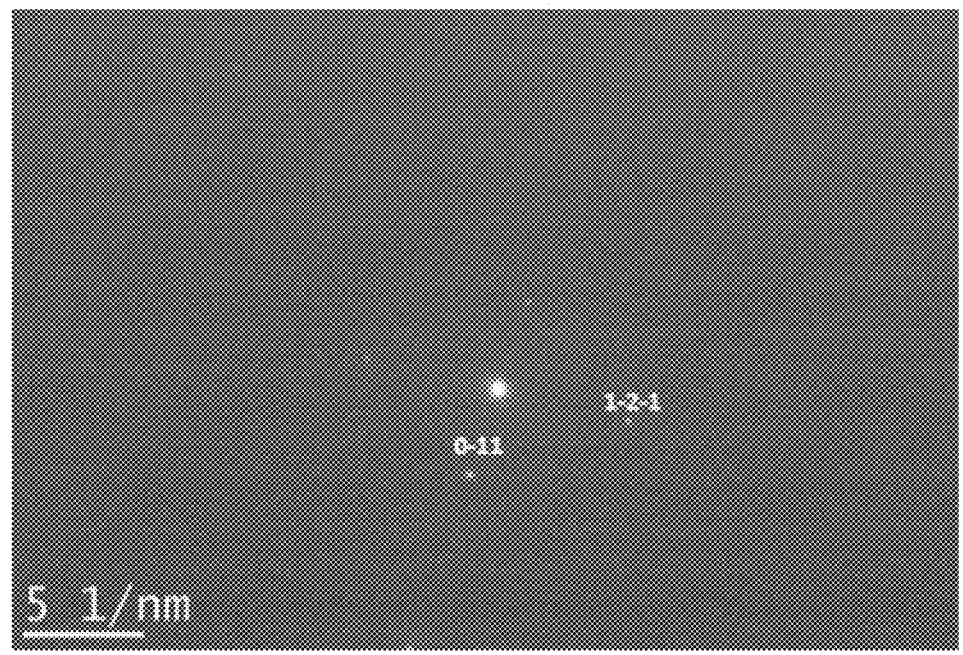
FIG. 9B shows a selected area electron diffraction (SAED) pattern obtained from the second ceramic phase (the grains exhibiting Ti and Zr in the STEM-EDX chemical analysis) in the ceramic sintered body of Example 2.
Figure 9C:
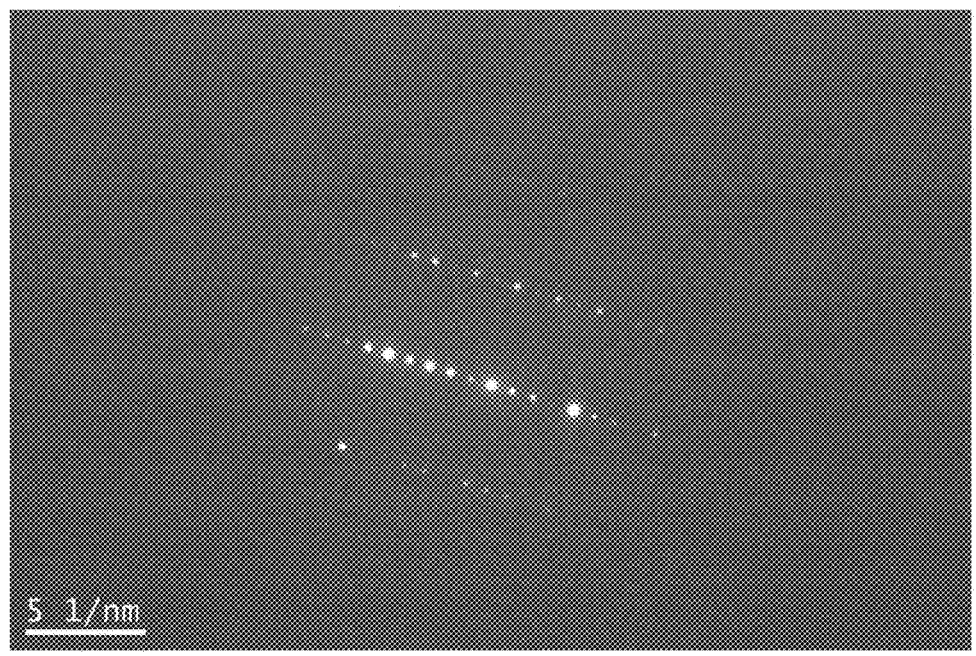
FIG. 9C shows a selected area electron diffraction (SAED) pattern obtained from the third ceramic phase (the grains exhibiting Ca, Zr and Ti in the STEM-EDX chemical analysis) in the ceramic sintered body of Example 2.
Figure 9D:
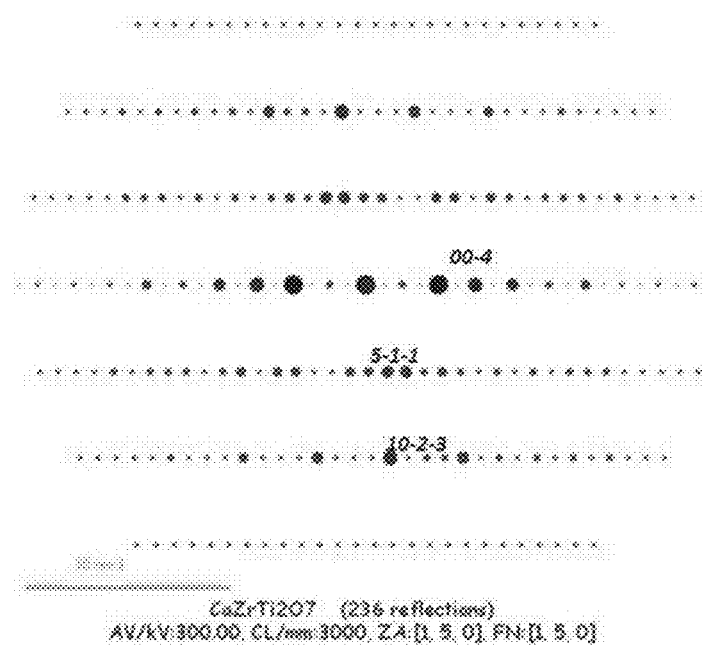
FIG. 9D shows a selected area electron diffraction (SAED) simulation pattern of (150) $CaZrTiO_7$ (zirconolite).

FIG. 9A shows a selected area electron diffraction pattern (SAED) obtained from the first ceramic phase (the grains exhibiting Sr, Ca and Ti in the STEM-EDX chemical analysis). The result indicates that the first ceramic phase is (212) $(Sr_{0.7}Ca_{0.3})TiO_3$. FIG. 9B shows a selected area electron diffraction pattern (SAED) obtained from the second ceramic phase (the grains exhibiting Ti and Zr in the STEM-EDX chemical analysis). The result indicates that the second ceramic phase is (311) $TiO_2$ (rutile), and is deduced as rutile structure $TiO_2$—$ZrO_2$ solid solution. FIG. 9C shows a selected area electron diffraction pattern (SAED) obtained from the third ceramic phase (the grains exhibiting Ca, Zr and Ti in the STEM-EDX chemical analysis). Comparing to the simulation result of (150) $CaZrTi_2O_7$ (zirconolite) shown in FIG. 9D, it is believed that the third ceramic phase is (150) $CaZrTi_2O_7$ (zirconolite).

Figure 10:
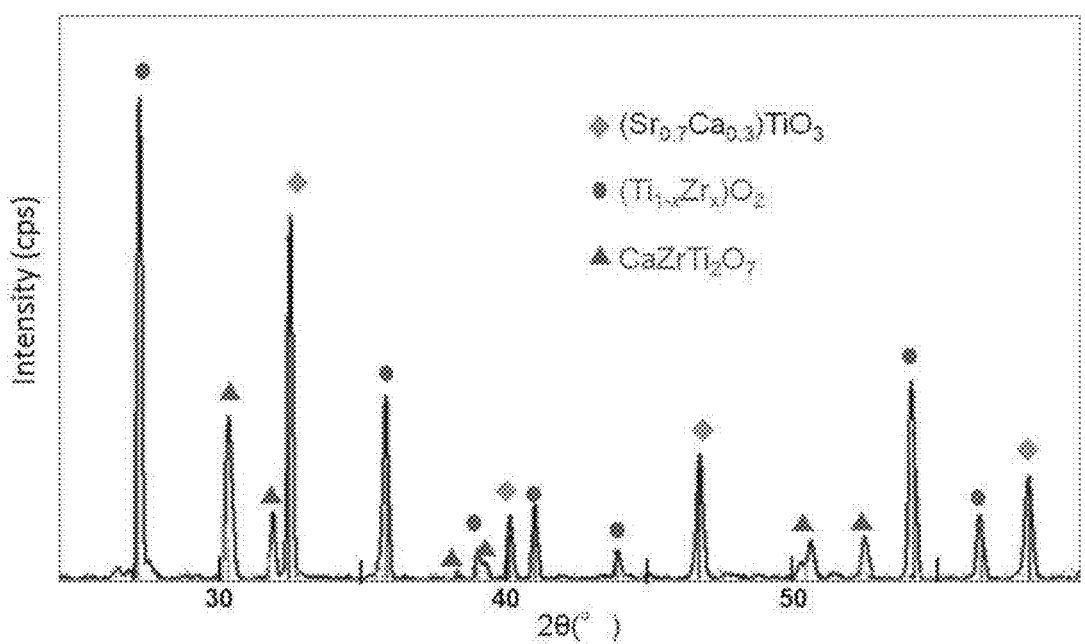
FIG. 10 shows an x-ray diffraction (XRD) pattern of the ceramic sintered body in Example 2.

FIG. 10 shows a XRD (x-ray diffraction) of the ceramic sintered body in Example 2. The peaks also reveal the existence of the first ceramic phase (i.e., $(Sr_{0.5}Ca_{0.5})TiO_3$ phase), the second ceramic phase (i.e., rutile structure $TiO_2$—$ZrO_2$ solid solution phase) and the third ceramic phase (i.e., $CaZrTi_2O_7$ phase) in the ceramic sintered body.

Figure 11A:
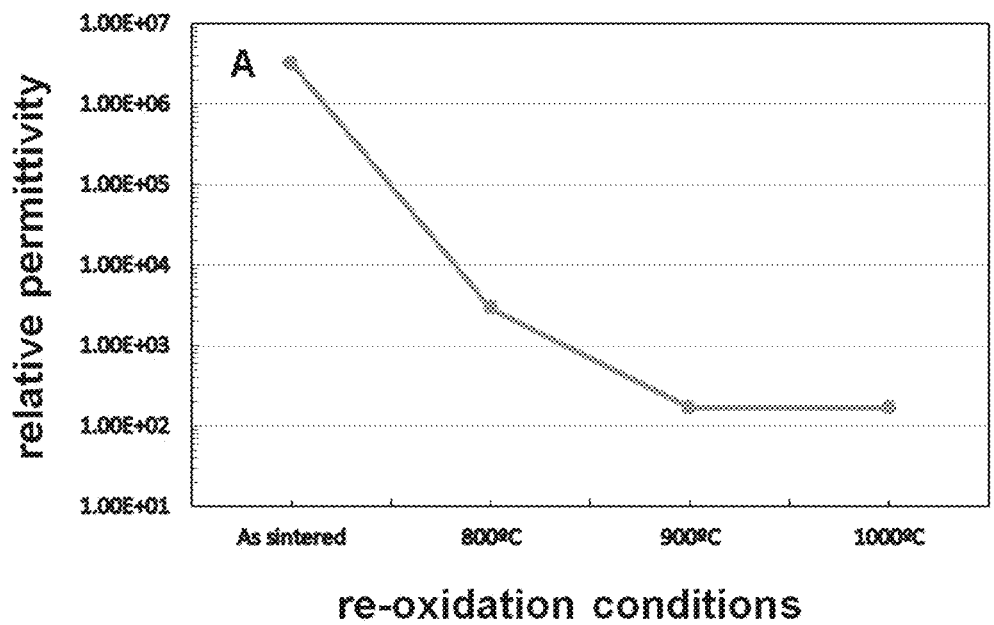
FIG. 11A shows relative dielectric constant of the ceramic sintered body in Example 2 under several different re-oxidation conditions.
Figure 11B:
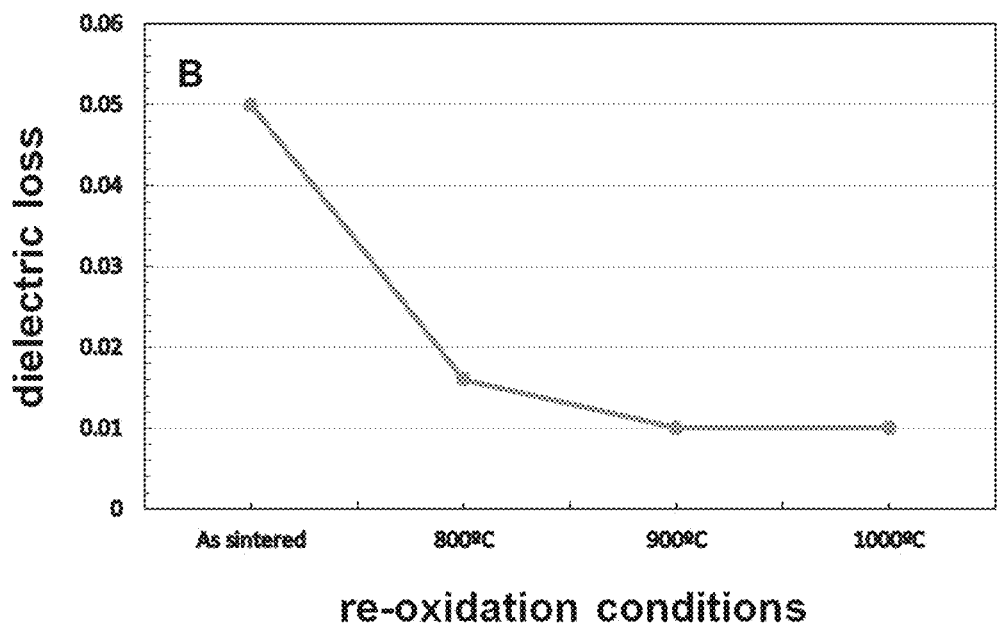
FIG. 11B shows dielectric loss of the ceramic sintered body in Example 2 under several different re-oxidation conditions.
Figure 11C:
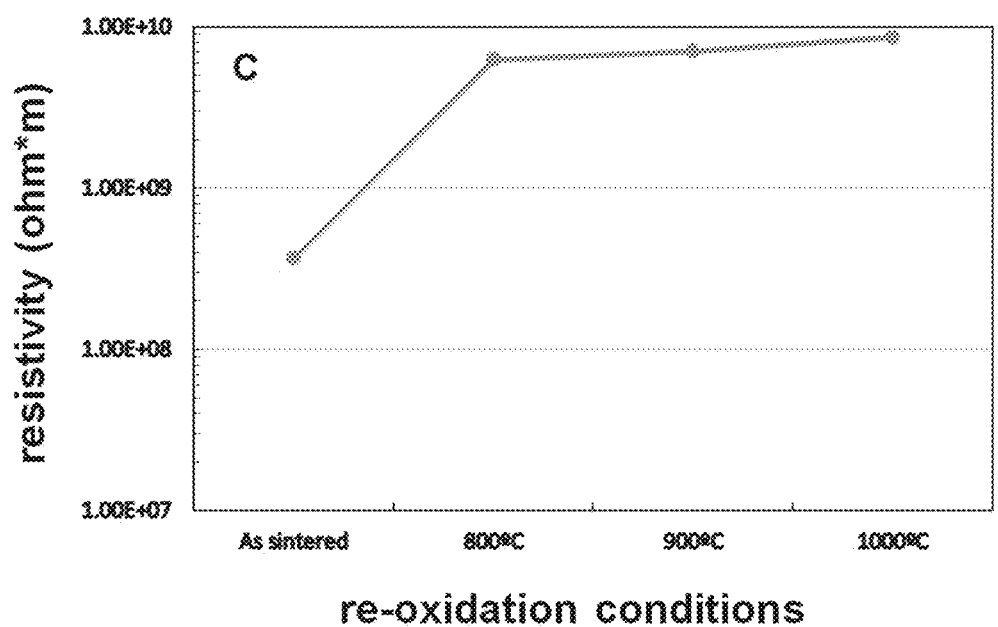
FIG. 11C shows resistivity of the ceramic sintered body in Example 2 under several different re-oxidation conditions.

FIG. 11A, FIG. 11B and FIG. 11C show relative dielectric constant, dielectric loss and resistivity of the ceramic sintered body in Example 2 under several different re-oxidation conditions. The decreases of dielectric constant and dielectric loss, and the increase of resistivity suggest increase of re-oxidation of $(Sr_{0.5}Ca_{0.5})TiO_3$ semiconductor phase. The obtained sintered ceramic body (mark as "as sintered" in FIGS. 11A to 11C) has a dielectric constant significantly larger than that of $(Sr_{0.5}Ca_{0.5})TiO_3$, $CaZrTi_2O_7$, and $TiO_2$—$ZrO_2$, and the dielectric constant decreases corresponding to the increase of re-oxidation temperature. The decrease of dielectric constant depending upon the oxidation level of semiconductor ceramic phase ($(Sr_{0.5}Ca_{0.5})TiO_3$) indicates that the sintered ceramic body is a sub-percolative composite. That is, the huge apparent relative dielectric constant stems from the sub-percolative structure.

Accordingly, the above analysis results show that the ceramic sintered body in Example 2 includes a semiconductor ceramic phase (i.e., $(Sr_{0.7}Ca_{0.3})TiO_3$ phase) dispersed in a dielectric ceramic phase (i.e., rutile structure $TiO_2$—$ZrO_2$ solid solution phase and $CaZrTi_2O_7$ phase), wherein the semiconductor ceramic phase and the dielectric ceramic phase jointly form a sub-percolative composite.

Figure 12:
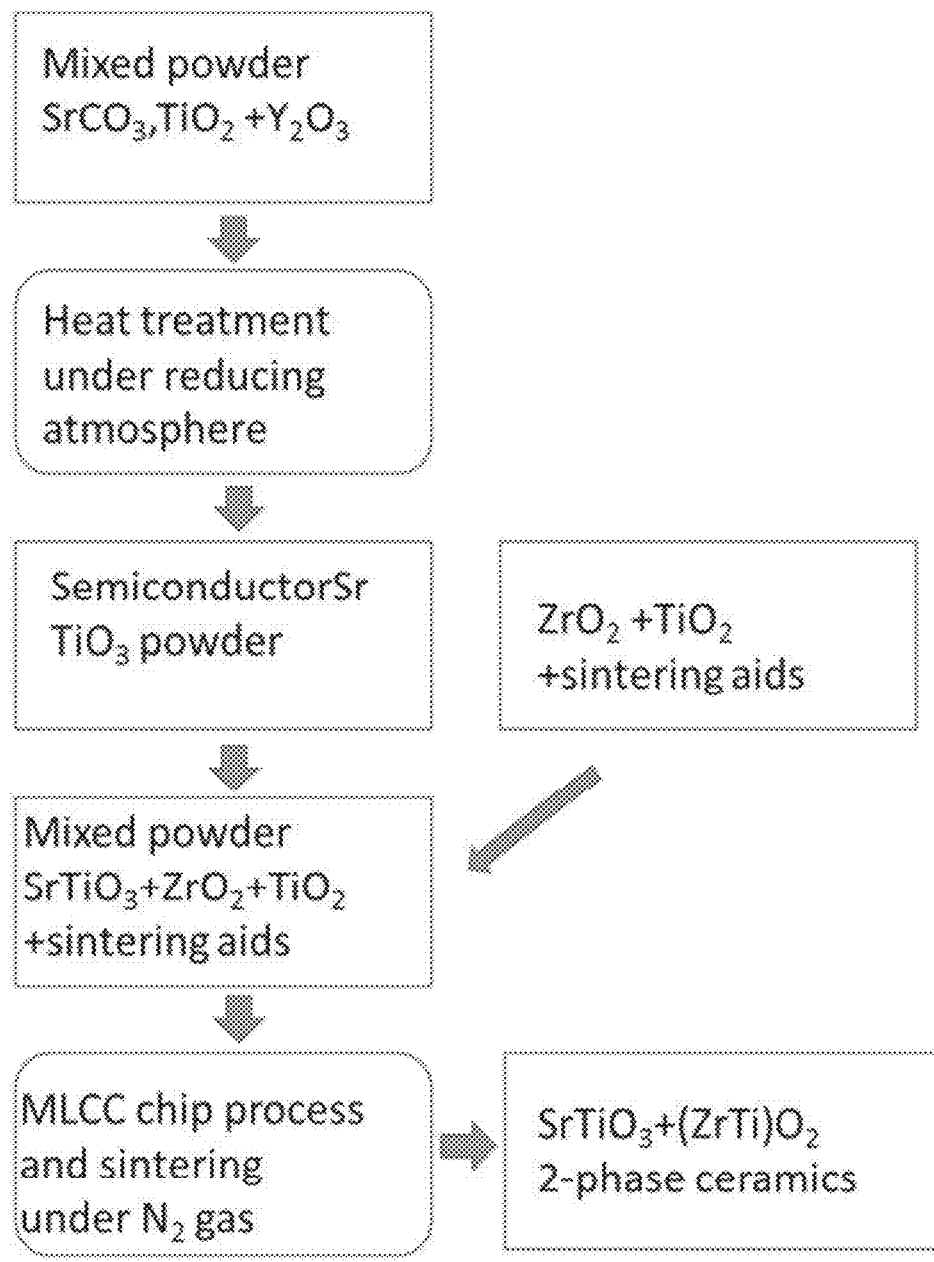
FIG. 12 shows a schematic process flow of Example 3.

Example 3: Ceramic Sintered Body Including $TiO_2$—$ZrO_2$ Solid Solution as the Dielectric Ceramic Phase, and $SrTiO_3$ as the Semiconductor Ceramic Phase FIG. 12 shows a schematic process flow of Example 3. 0.25 mole of strontium carbonate ($SrCO_3$) and 0.25 mole of $TiO_2$ (anatase) were mixed by bead miller (zirconium oxide beads, with a diameter f 0.1 mm) in ethanol. After mixing, the mixed powder was dried in nitrogen gas flow. The obtained mixture was dry-ground and calcined at 1,000° C. in $N_2$+$H_2$ (95%+5%) gas flow for 5 hours to obtain a black colored semiconductor $SrTiO_3$ powder. 0.5 mole of zirconium oxide ($ZrO_2$) and 0.5 of mole titanium oxide ($TiO_2$) (anatase) were added to the dry-ground powder and mixed again by bead miller.

100 parts by weight of the powder thus formed were milled in a solvent containing 35% toluene and 65% MEK (v/v), and were then mixed with 15 parts by weight of polyacrylate, 0.3 part by weight of $SrSiO_3$, 0.1 part by weight of $GeO_2$ and 0.1 part by weight of $MnO_2$ to form a slurry. The slurry was coated on a PET carrier tape to form a green sheet using a coating machine. The green sheet was punched to form a plurality of pellets. The pellets were heated for 60 minutes at a partial pressure of oxygen greater than 0.015 atm and a temperature of 450° C. to remove the organic binder. The pellets were then sintered at a temperature of 1300° C. for 30 minutes under an atmosphere containing $N_2$ to form a ceramic sintered body. The theoretical percolation threshold of the above condition is about 28.95%, and the volume fraction of the semiconductor ceramic phase ($SrTiO_3$) in the ceramic sintered body is about 27.8%. To verify the homogenous mixing state of semiconductor ceramic grains and dielectric ceramic grains in the sintered ceramic body, the samples were respectively re-oxidized for 30 minutes at 800° C., 900° C. and 1000° C. in air before measurement of the dielectric properties. The obtained sintered bodies were polished 100 micrometers in depth from both sides to deposit Au electrode for dielectric measurement.

Figure 13A:
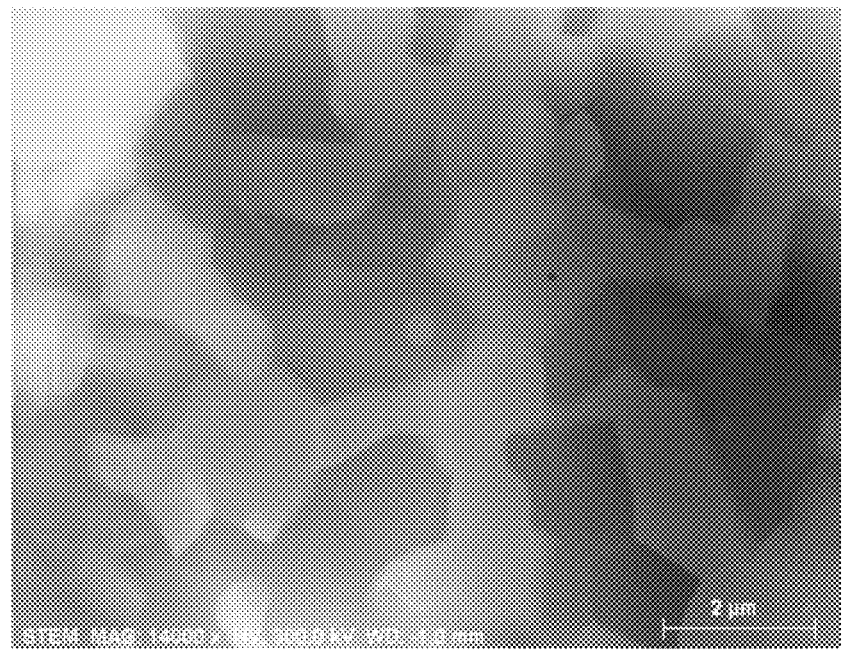
FIG. 13A shows a high-angle annular dark-filed (HAADF) image of the ceramic sintered body in Example 3.
Figure 13B:
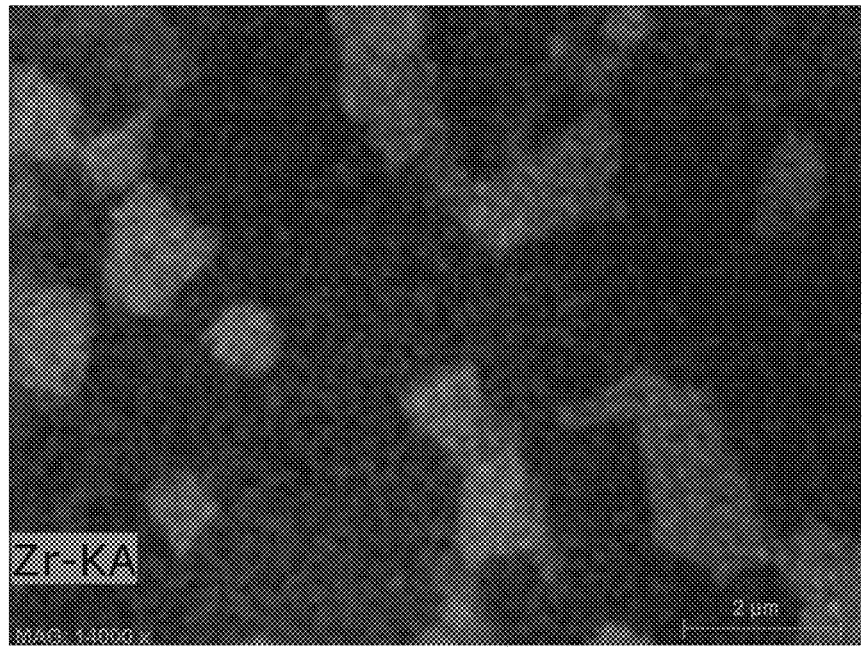
FIG. 13B shows STEM-EDX chemical analysis of Zr in the ceramic sintered body of Example 3.
Figure 13C:
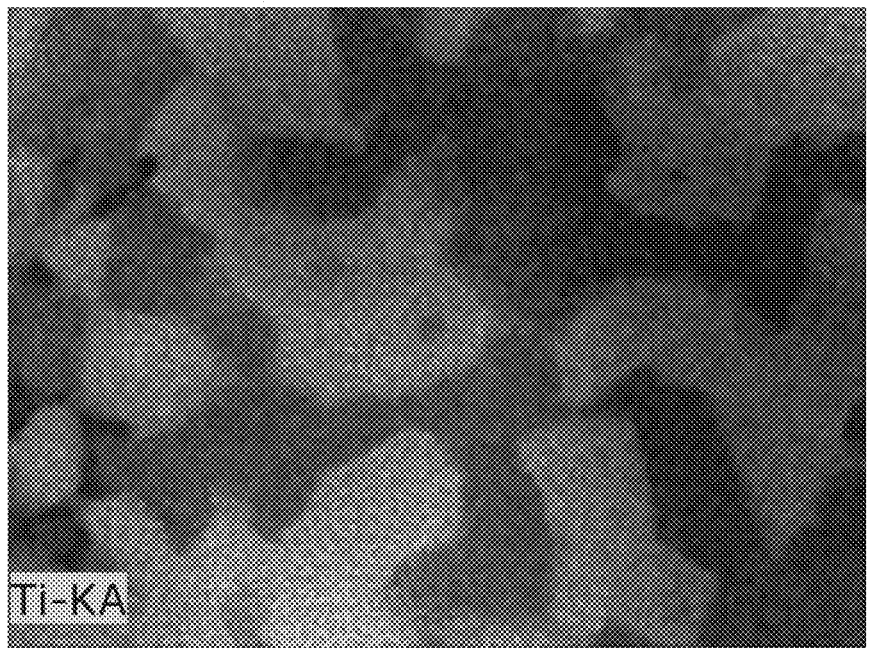
FIG. 13C shows STEM-EDX chemical analysis of Ti in the ceramic sintered body of Example 3.
Figure 13D:
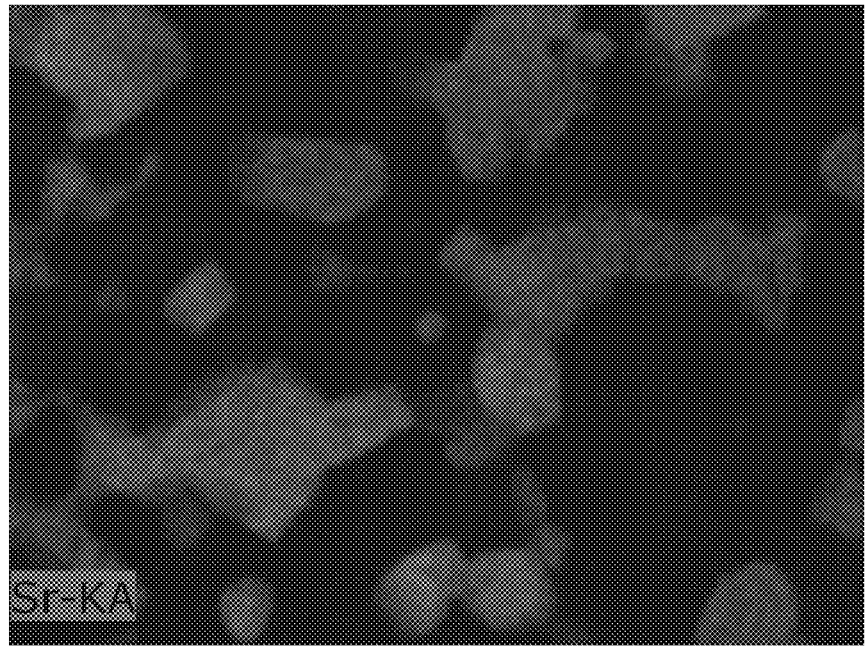
FIG. 13D shows STEM-EDX chemical analysis of Sr in the ceramic sintered body of Example 3.

FIG. 13A shows a high-angle annular dark-filed (HAADF) image of the ceramic sintered body in Example 3. The contrast differences of the image indicate several ceramic phases. Further, the STEM-EDX chemical analysis (FIG. 13B to FIG. 13D) proves the existence of a first ceramic phase (Sr—Ti) and a second ceramic phase (Ti—Zr).

Figure 14A:
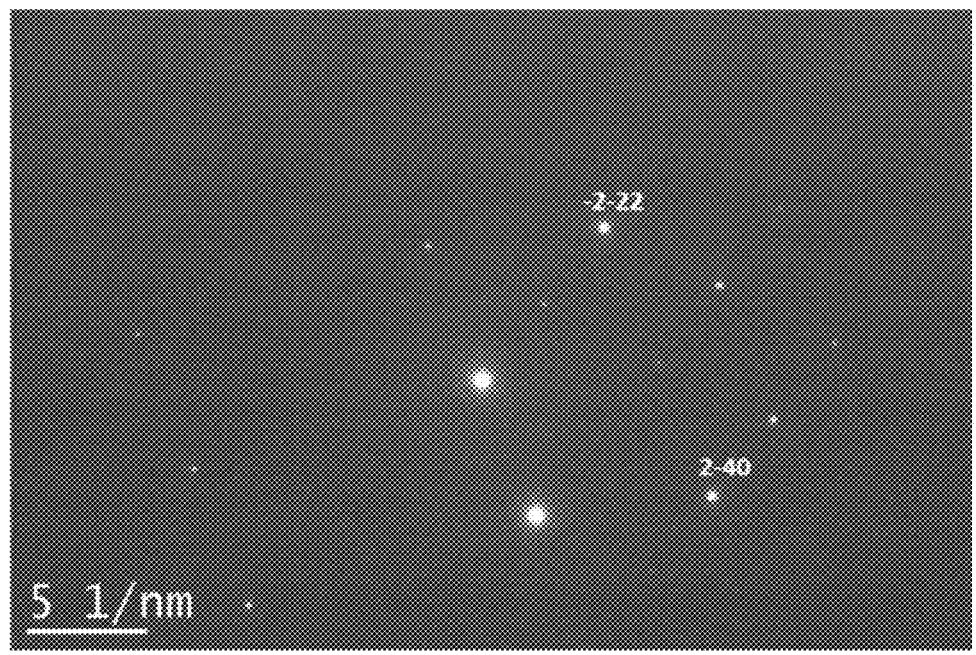
FIG. 14A shows selected area diffraction (SAD) pattern obtained from the first ceramic phase (the grains exhibiting Sr, Ca and Ti in the STEM-EDX chemical analysis) in the ceramic sintered body of Example 3.
Figure 14B:
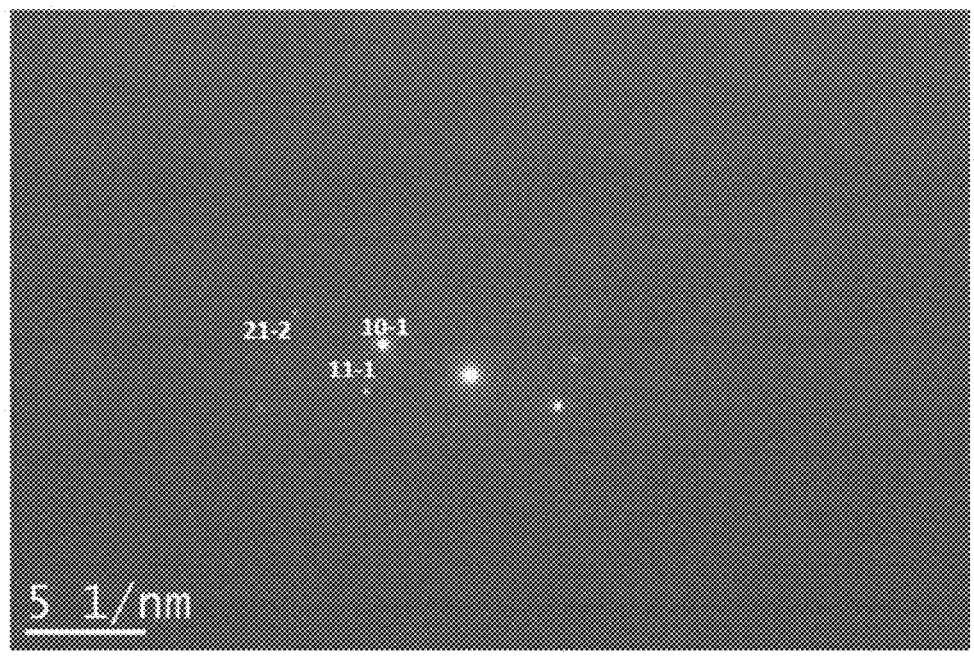
FIG. 14B shows selected area diffraction (SAD) pattern obtained from the second ceramic phase (the grains exhibiting Zr and Ti in the STEM-EDX chemical analysis) in the ceramic sintered body of Example 3.

FIG. 14A shows a selected area electron diffraction pattern (SAED) obtained from the first ceramic phase (the grains exhibiting Sr and Ti in the STEM-EDX chemical analysis). The result indicates that the first ceramic phase is (112) $SrTiO_3$. FIG. 14B shows a selected area electron diffraction pattern (SAED) obtained from the second ceramic phase (the grains exhibiting Ti and Zr in the STEM-EDX chemical analysis). The result indicates that the second ceramic phase is (101) $TiO_2$ (rutile), and is deduced as rutile structure $TiO_2$—$ZrO_2$ solid solution.

Figure 15:
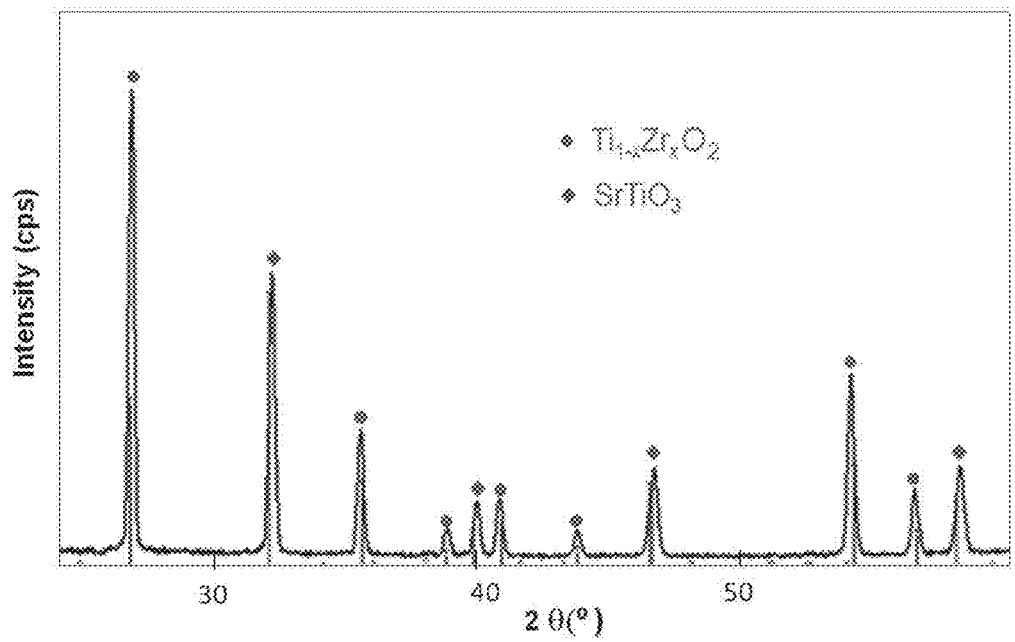
FIG. 15 shows an X-ray diffraction (XRD) pattern of the ceramic sintered body in example 3.

FIG. 15 shows a XRD (x-ray diffraction) of the ceramic sintered body in Example 3. The peaks also reveal the existence of the first ceramic phase (i.e., $SrTiO_3$ phase) and the second ceramic phase (i.e., rutile structure $TiO_2$—$ZrO_2$ solid solution phase).

Figure 16A:
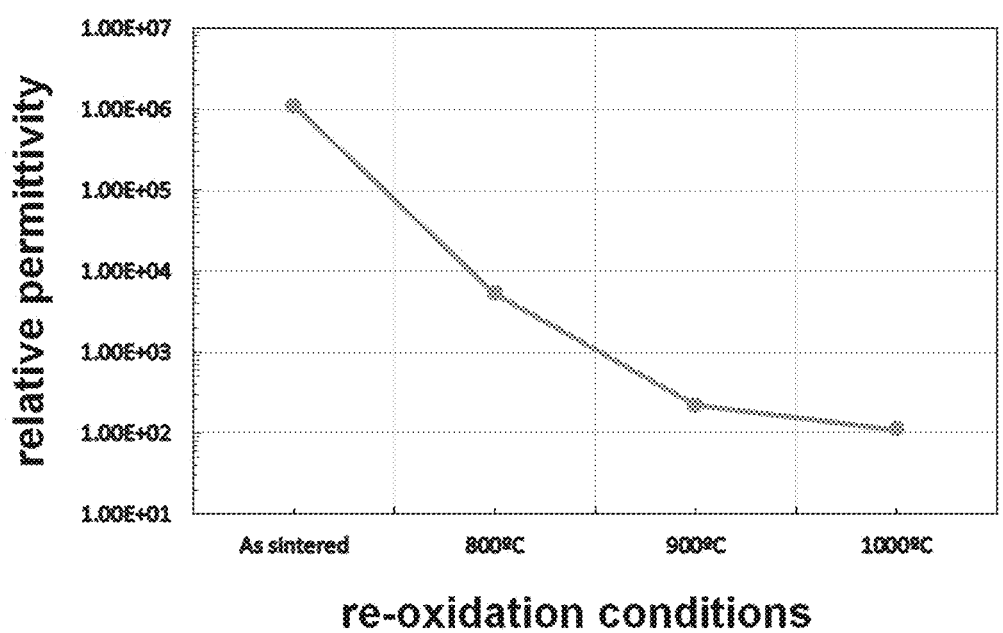
FIG. 16A shows relative dielectric constant of the ceramic sintered body in Example 3 under several different re-oxidation conditions.
Figure 16B:
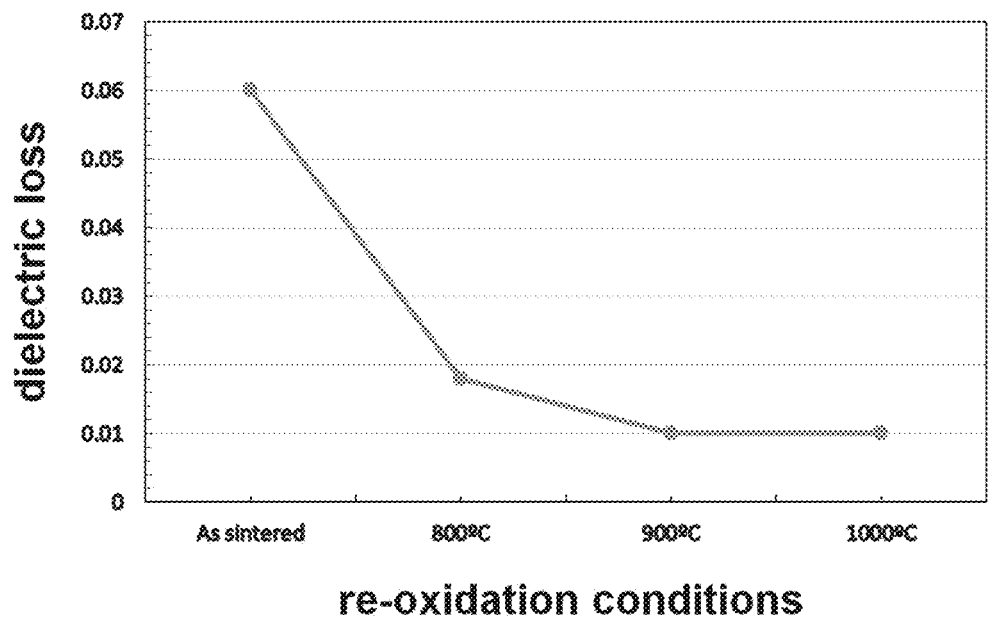
FIG. 16B shows dielectric loss of the ceramic sintered body in Example 3 under several different re-oxidation conditions.
Figure 16C:
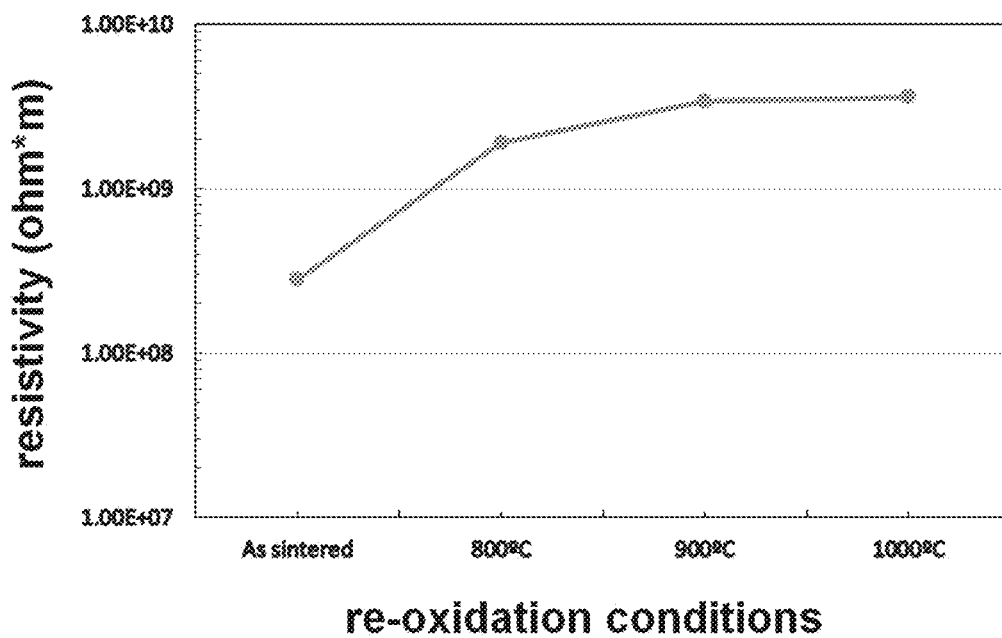
FIG. 16C shows resistivity of the ceramic sintered body in Example 3 under several different re-oxidation conditions.

FIG. 16A, FIG. 16B and FIG. 16C show relative dielectric constant, dielectric loss and resistivity of the ceramic sintered body in Example 3 under several different re-oxidation conditions. The decreases of dielectric constant and dielectric loss, and the increase of resistivity suggest increase of re-oxidation of $SrTiO_3$ semiconductor phase. The obtained sintered ceramic body (mark as "as sintered" in FIGS. 16A to 16C) has a dielectric constant significantly larger than that of $SrTiO_3$ and $TiO_2$—$ZrO_2$, and the dielectric constant decreases corresponding to the increase of re-oxidation temperature. The decrease of dielectric constant depending upon the oxidation level of semiconductor ceramic phase (($Sr_{0.5}Ca_{0.5}$)$TiO_3$) indicates that the sintered ceramic body is a sub-percolative composite. That is, the huge apparent relative dielectric constant stems from the sub-percolative structure.

Figure 17:
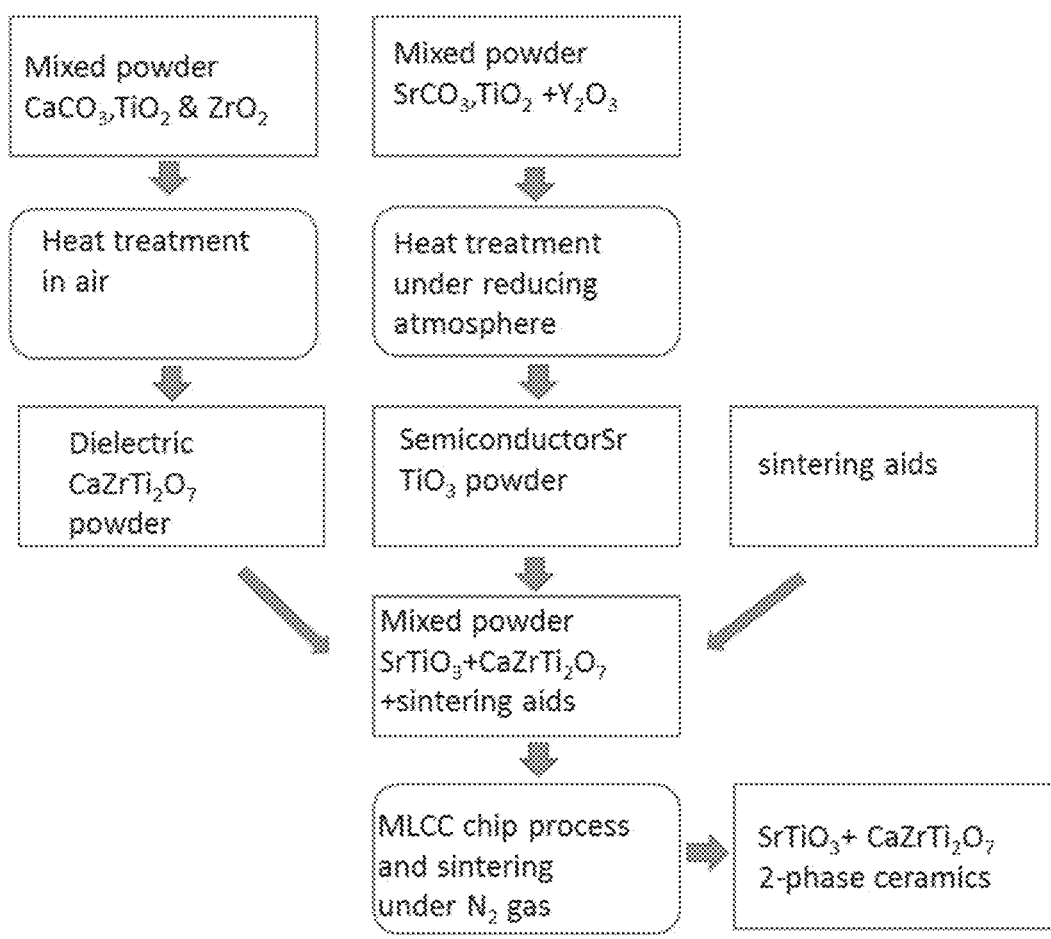
FIG. 17 shows a schematic process flow of Example 4.

Example 4: Ceramic Sintered Body Including $CaZrTi_2O_7$ as the Dielectric Ceramic Phase, and $SrTiO_3$ as the Semiconductor Ceramic Phase FIG. 17 shows a schematic process flow of Example 4. 0.56 mole of strontium carbonate ($SrCO_3$), 0.56 mole of $TiO_2$ (anatase) and 0.015 mole of $Y_2O_3$ were mixed by bead miller (zirconium oxide beads, with a diameter f 0.1 mm) in ethanol. After mixing, the mixed powder was dried in nitrogen gas flow. The obtained mixture was dry-ground and calcined at 1,000° C. in $N_2+H_2$ (95%+5%) gas flow for 5 hours to obtain a black colored semiconductor $SrTiO_3$ powder. 1.0 mole of zirconolite ($CaZrTi_2O_7$) was added to the dry-ground powder and mixed again by bead miller.

100 parts by weight of the powder thus formed were milled in a mixture of toluene and MEK solvent, and were then mixed with 15 parts by weight of a ethyl cellulose binder, 0.3 part by weight of $SrSiO_3$, 0.1 part by weight of $GeO_2$ and 0.1 part by weight of $MnO_2$ to form a slurry. The slurry was coated on a PET carrier tape to form a green sheet using a coating machine. The green sheet was punched to form a plurality of pellets. The pellets were heated for 30 minutes at a partial pressure of oxygen greater than 0.015 atm and a temperature of 550° C. to remove the organic binder. The pellets were then sintered at a temperature of 1300° C. for 30 minutes under an atmosphere containing $N_2$ to form a ceramic sintered body. The theoretical percolation threshold of the above condition is about 28.95%, and the volume fraction of the semiconductor ceramic phase ($SrTiO_3$) in the ceramic sintered body is about 28%. To verify the homogenous mixing state of semiconductor ceramic grains and dielectric ceramic grains in the sintered ceramic body, the samples were respectively re-oxidized for 30 minutes at 800° C., 900° C. and 1000° C. in air before measurement of the dielectric properties. The obtained sintered bodies were polished 100 micrometers in depth from both sides to deposit Au electrode for dielectric measurement.

Figure 18A:
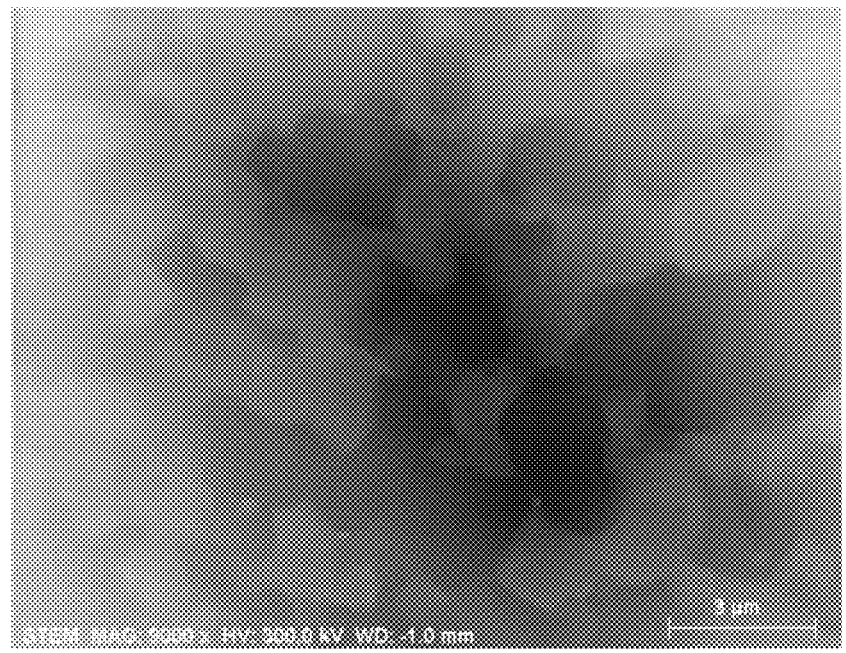
FIG. 18A shows a high-angle annular dark-filed (HAADF) image of the ceramic sintered body in Example 4.
Figure 18B:
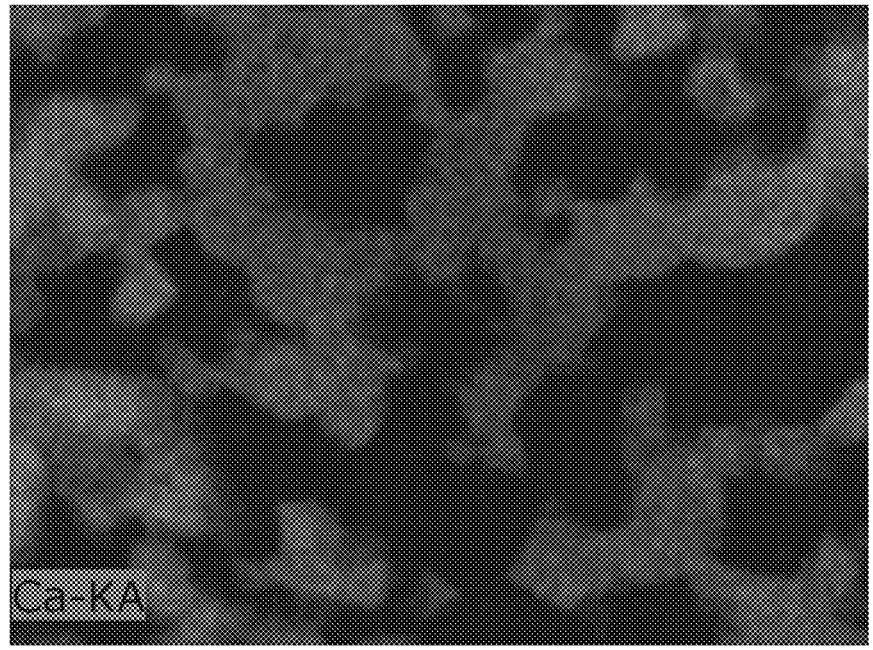
FIG. 18B shows STEM-EDX chemical analysis of Ca in the ceramic sintered body of Example 4.
Figure 18C:
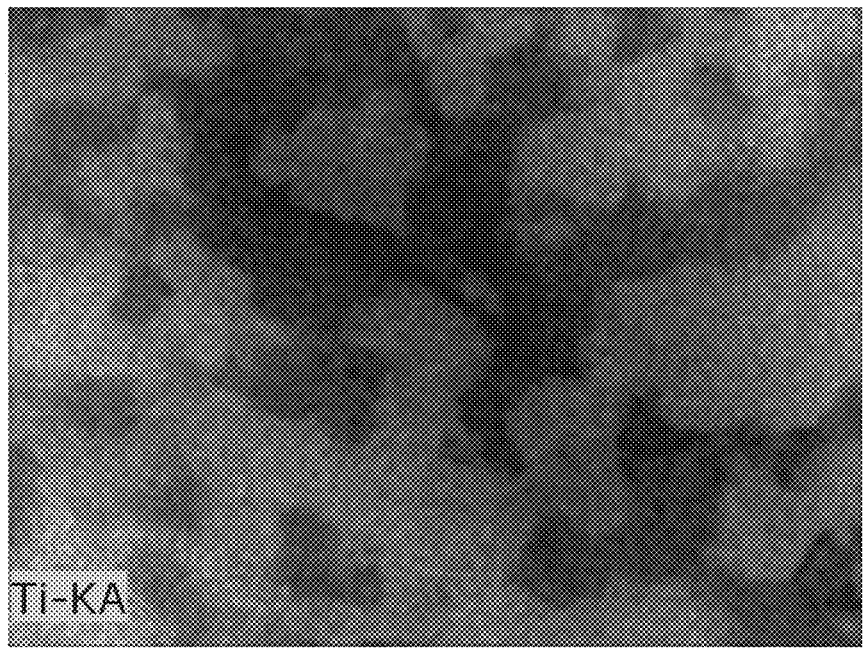
FIG. 18C shows STEM-EDX chemical analysis of Ti in the ceramic sintered body of Example 4.
Figure 18D:
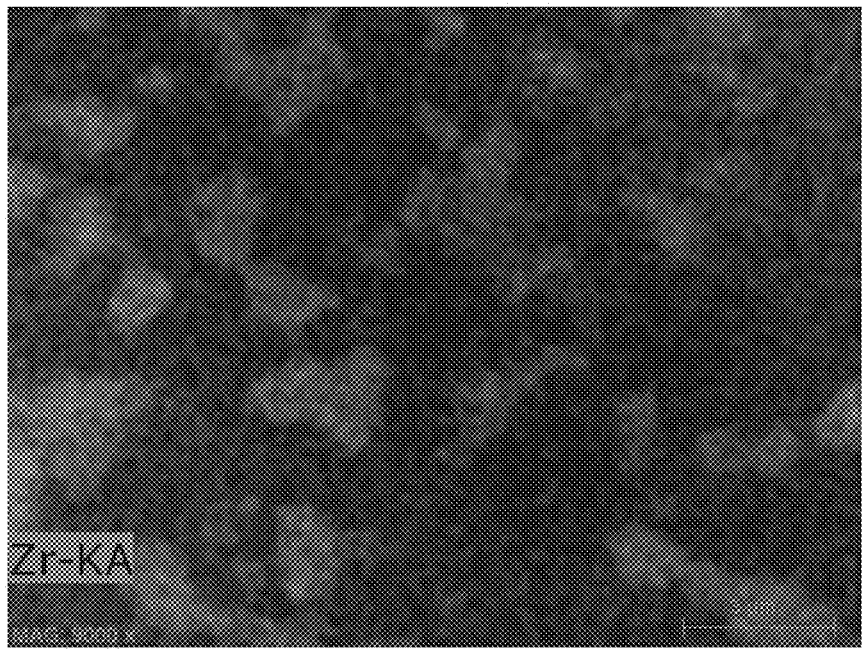
FIG. 18D shows STEM-EDX chemical analysis of Zr in the ceramic sintered body of Example 4.
Figure 18E:
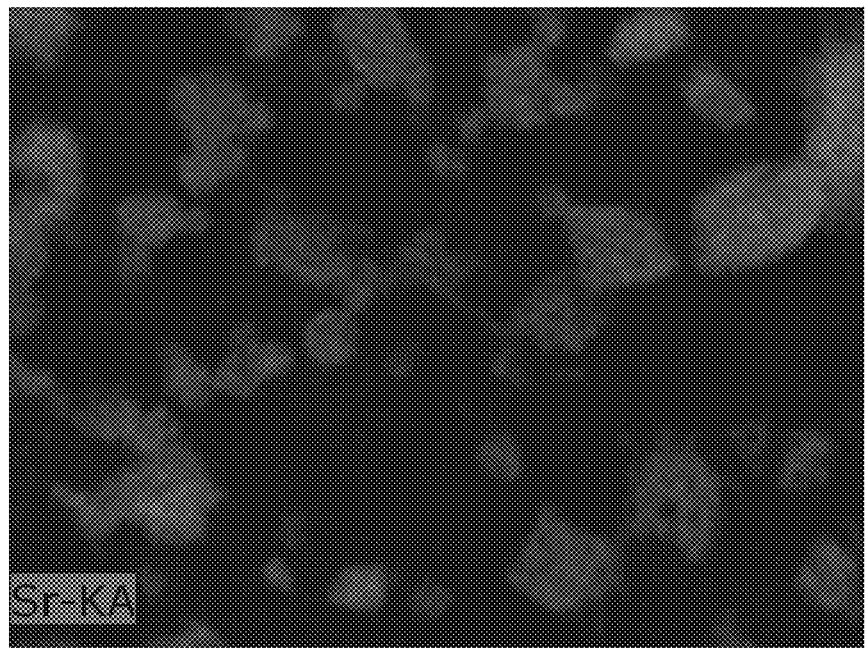
FIG. 18E shows STEM-EDX chemical analysis of Sr in the ceramic sintered body of Example 4.

FIG. 18A shows a high-angle annular dark-filed (HAADF) image of the ceramic sintered body in Example 4. The contrast differences of the image indicate several ceramic phases. Further, the STEM-EDX chemical analysis (FIG. 18B to FIG. 18E) proves the existence of a first ceramic phase (Sr—Ti) and a second ceramic phase (Ca—Zr—Ti).

Figure 19A:
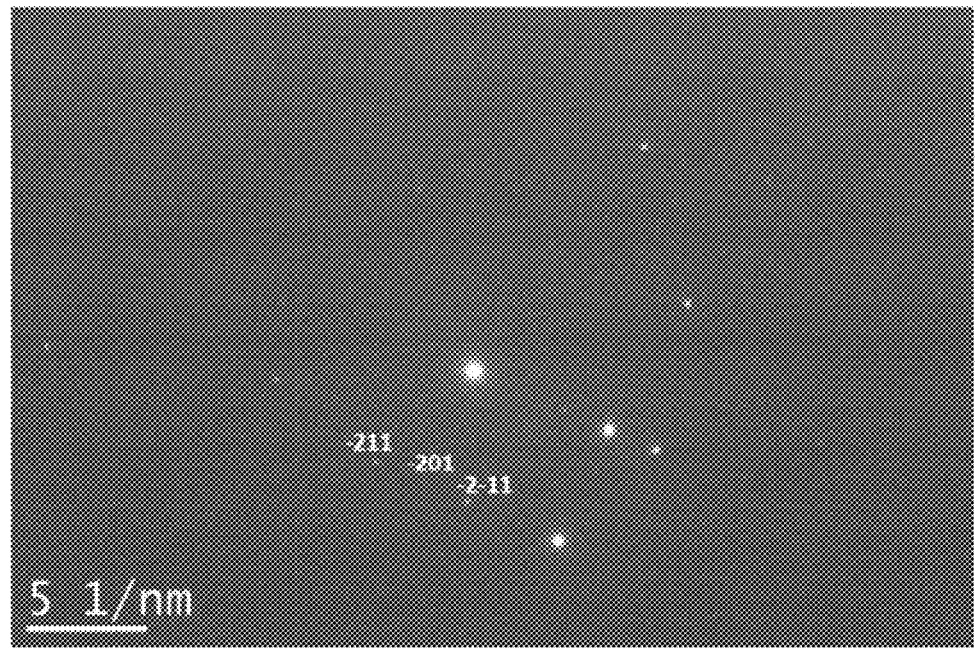
FIG. 19A shows selected area diffraction (SAD) pattern obtained from the first ceramic phase (the grains exhibiting Sr and Ti in the STEM-EDX chemical analysis) in the ceramic sintered body of Example 4.
Figure 19B:
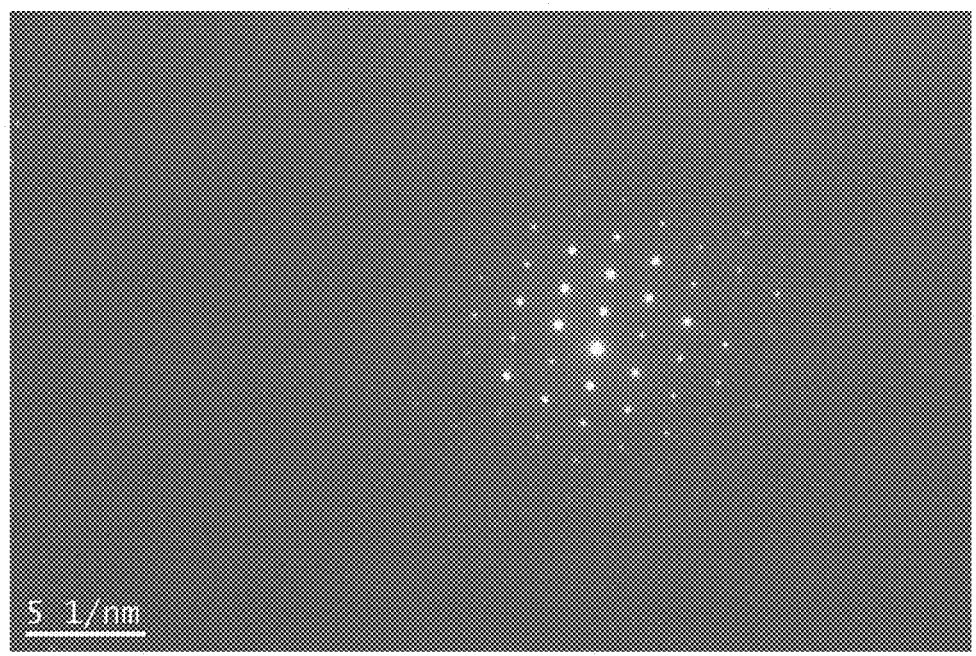
FIG. 19B shows selected area diffraction (SAD) pattern obtained from the second ceramic phase (the grains exhibiting Ca, Zr and Ti in the STEM-EDX chemical analysis) in the ceramic sintered body of Example 4.
Figure 19C:
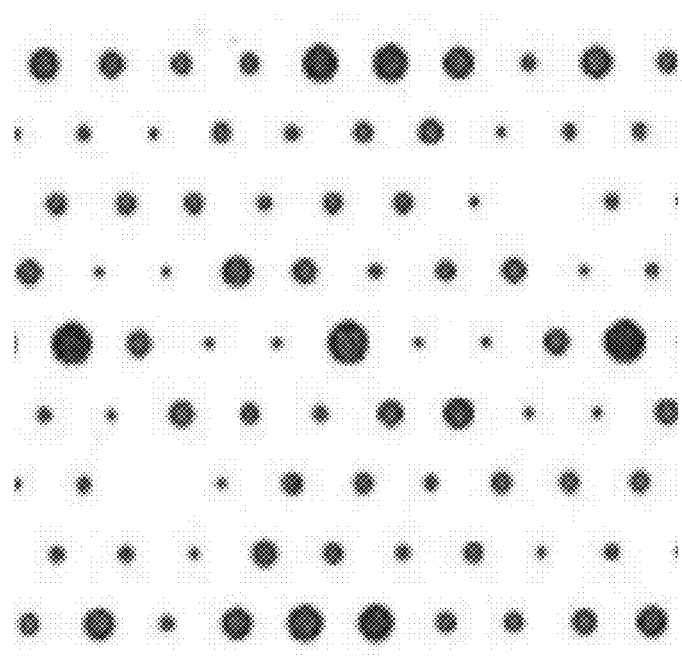
FIG. 19C shows a selected area electron diffraction (SAED) simulation pattern of (011) CaZrTiO$_7$ (zirconolite).

FIG. 19A shows a selected area electron diffraction pattern (SAED) obtained from the first ceramic phase (the grains exhibiting Sr and Ti in the STEM-EDX chemical analysis). The result indicates that the first ceramic phase is (102) $SrTiO_3$. FIG. 19B shows a selected area electron diffraction pattern (SAED) obtained from the second ceramic phase (the grains exhibiting Ca, Ti and Zr in the STEM-EDX chemical analysis). The result indicates that the second ceramic phase is (011) $CaZrTi_2O_7$ (zirconolite). Comparing to the simulation result of (011) $CaZrTi_2O_7$ (zirconolite) shown in FIG. 19C, it is believed that the third ceramic phase is (011) $CaZrTi_2O_7$ (zirconolite).

Figure 20:
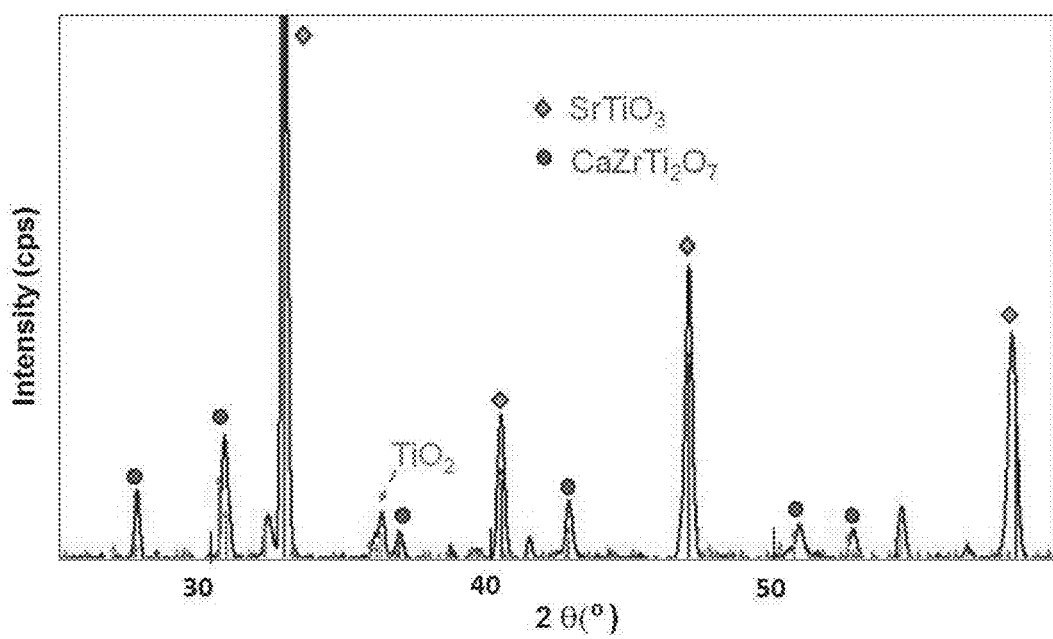
FIG. 20 shows an X-ray diffraction (XRD) pattern of the ceramic sintered body in example 4.

FIG. 20 shows a XRD (x-ray diffraction) of the ceramic sintered body in Example 4. The peaks also reveal the existence of the first ceramic phase (i.e., $SrTiO_3$ phase) and the second ceramic phase (i.e., $CaZrTi_2O_7$ (zirconolite)).

Figure 21A:
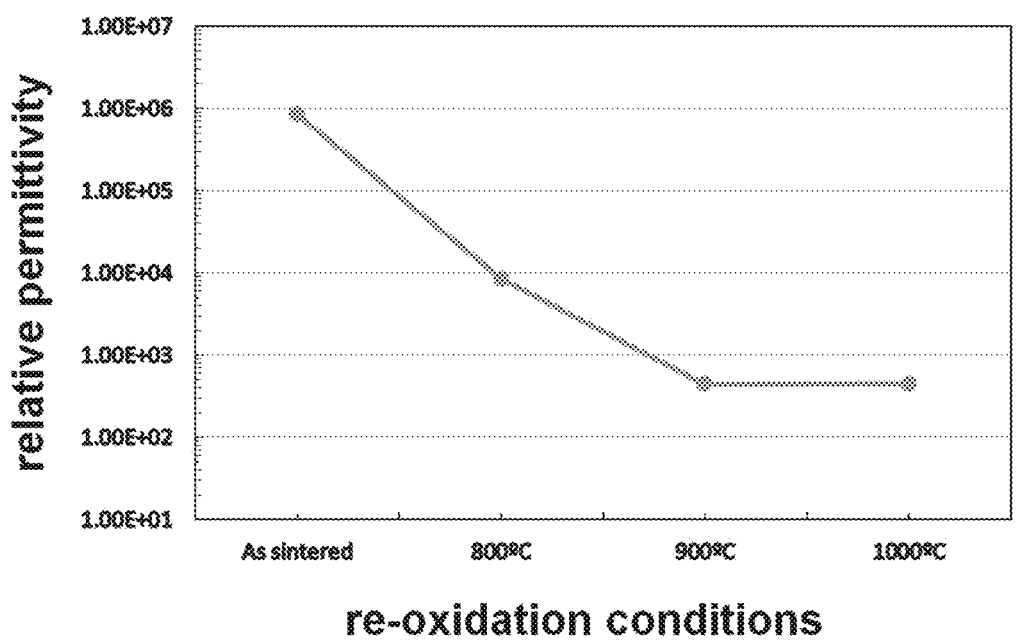
FIG. 21A shows relative dielectric constant of the ceramic sintered body in Example 4 under several different re-oxidation conditions.
Figure 21B:
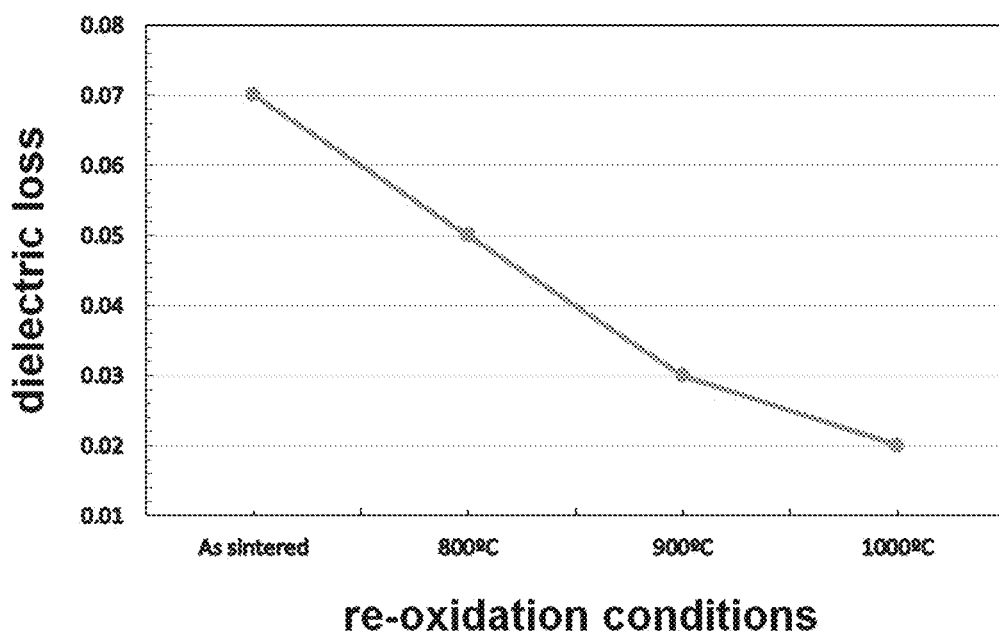
FIG. 21B shows dielectric loss of the ceramic sintered body in Example 4 under several different re-oxidation conditions.
Figure 21C:
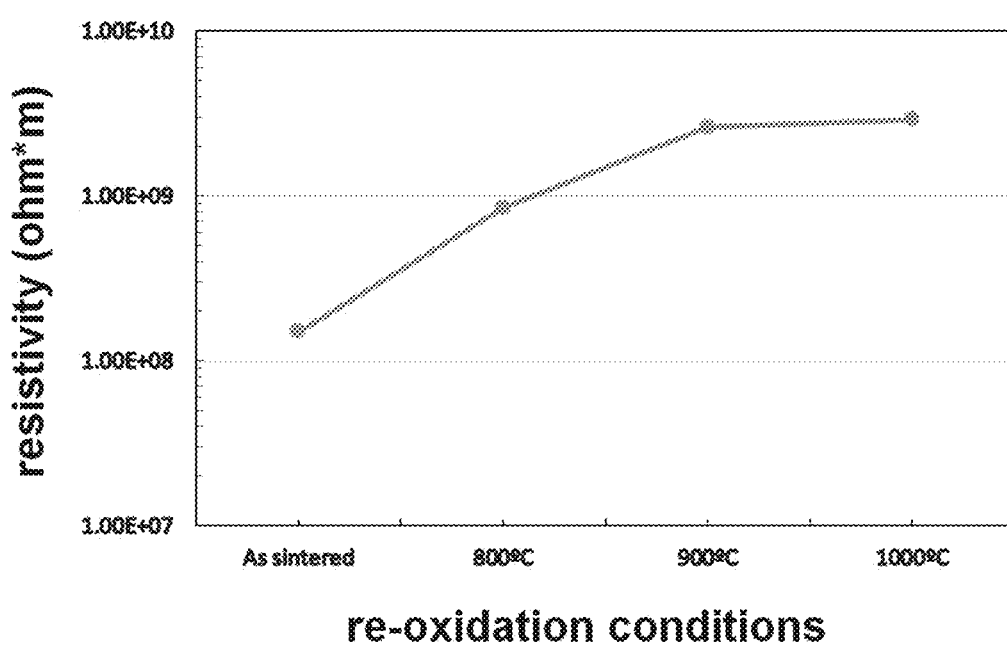
FIG. 21C shows resistivity of the ceramic sintered body in Example 4 under several different re-oxidation conditions.

FIG. 21A, FIG. 21B and FIG. 21C show relative dielectric constant, dielectric loss and resistivity of the ceramic sintered body in Example 4 under several different re-oxidation conditions. The decreases of dielectric constant and dielectric loss, and the increase of resistivity suggest increase of re-oxidation of $SrTiO_3$ semiconductor phase. The obtained sintered ceramic body (mark as "as sintered" in FIGS. 11A to 11C) has a dielectric constant significantly larger than that of $SrTiO_3$ and $CaZrTi_2O_7$, and the dielectric constant decreases corresponding to the increase of re-oxidation temperature. The decrease of dielectric constant depending upon the oxidation level of semiconductor ceramic phase ($SrTiO_3$) indicates that the sintered ceramic body is a sub-percolative composite. That is, the huge apparent relative dielectric constant stems from the sub-percolative structure.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A passive component comprising a ceramic sintered body, wherein the passive component is a capacitor, an inductor, or a transformer, the ceramic sintered body comprises a semiconductor ceramic phase dispersed in a dielectric ceramic phase, the semiconductor ceramic phase and the dielectric ceramic phase jointly form a composite, a volume fraction of the semiconductor ceramic phase is about 0.05% to about 20% less than a percolation threshold, the material of the dielectric ceramic phase is a first compound non-doped or doped with a first additive, the first compound is selected from a group consisting of $CaZrTi_2O_7$ (zirconolite), $CaZrO_3$, $SrZrO_3$, $BaZrO_3$, $TiO_2$ (rutile), $ZrO_2$, and solid solutions of any two or more of $CaZrTi_2O_7$, $CaZrO_3$, $SrZrO_3$, $BaZrO_3$, $TiO_2$ and $ZrO_2$, the material of the semiconductor ceramic phase is a second compound non-doped or doped with a second additive, and the second compound is selected from a group consisting of perovskite materials and reduced $TiO_2$ (rutile).

2. The passive component of claim 1, wherein the perovskite materials are selected from a group consisting of strontium titanate ($SrTiO_3$), barium titanate ($BaTiO_3$), calcium titanate ($CaTiO_3$), nickel titanate ($NiTiO_3$), manganese titanate ($MnTiO_3$), cobalt titanate ($CoTiO_3$), copper titanate ($CuTiO_3$), magnesium titanate ($MgTiO_3$) and complexes of any two or more of strontium titanate, barium titanate, calcium titanate, nickel titanate, manganese titanate, cobalt titanate, copper titanate and magnesium titanate.

3. The passive component of claim 1, wherein the first additive is an acceptor-type additive selected from a group consisting of V, Nb, Cr, manganese compounds, magnesium compounds, silicate compounds and alumina compounds.

4. The passive component of claim 1, wherein the second additive is a donor-type additive selected from a group consisting of Y, Nb and La.

5. A passive component comprising a ceramic sintered body, wherein the passive component is a capacitor, an inductor, or a transformer, the ceramic sintered body of comprises a semiconductor ceramic phase dispersed in a dielectric ceramic phase, wherein the semiconductor ceramic phase and the dielectric ceramic phase jointly form a composite, a volume fraction of the semiconductor ceramic phase is about 0.999 times to about 0.33 times the percolation threshold, the material of the dielectric ceramic phase is a first compound non-doped or doped with a first additive, the first compound is selected from a group consisting of $CaZrTi_2O_7$ (zirconolite), $CaZrO_3$, $SrZrO_3$, $BaZrO_3$, $TiO_2$ (rutile), $ZrO_2$, and solid solutions of any two or more of $CaZrTi_2O_7$, $CaZrO_3$, $SrZrO_3$, $BaZrO_3$, $TiO_2$ and $ZrO_2$, and the material of the semiconductor ceramic phase is a second compound non-doped or doped with a second additive, and the second compound is selected from a group consisting of perovskite materials and reduced $TiO_2$ (rutile).

6. The passive component of claim 5, wherein the perovskite materials are selected from a group consisting of strontium titanate ($SrTiO_3$), barium titanate ($BaTiO_3$), calcium titanate ($CaTiO_3$), nickel titanate ($NiTiO_3$), manganese titanate ($MnTiO_3$), cobalt titanate ($CoTiO_3$), copper titanate ($CuTiO_3$), magnesium titanate ($MgTiO_3$) and complexes of any two or more of strontium titanate, barium titanate, calcium titanate, nickel titanate, manganese titanate, cobalt titanate, copper titanate and magnesium titanate.

7. The passive component of claim 5, wherein the first additive is an acceptor-type additive selected from a group consisting of V, Nb, Cr, manganese compounds, magnesium compounds, silicate compounds and alumina compounds.

8. The passive component of claim 5, wherein the second additive is a donor-type additive selected from a group consisting of Y, Nb and La.

* * * * *